(12) United States Patent
MacDonald et al.

(10) Patent No.: US 12,444,293 B2
(45) Date of Patent: Oct. 14, 2025

(54) ALARM PLATFORM WITH AGGREGATED ALARM EVENTS

(71) Applicant: SimpliSafe, Inc., Boston, MA (US)

(72) Inventors: Graham MacDonald, Bedford, NH (US); Bojan Rajkovic, Salem, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/895,668

(22) Filed: Sep. 25, 2024

(65) Prior Publication Data
US 2025/0259530 A1 Aug. 14, 2025

Related U.S. Application Data

(60) Provisional application No. 63/551,860, filed on Feb. 9, 2024.

(51) Int. Cl.
*G08B 25/14* (2006.01)
*G08B 25/00* (2006.01)
*H04W 4/029* (2018.01)

(52) U.S. Cl.
CPC ........... *G08B 25/14* (2013.01); *G08B 25/001* (2013.01); *H04W 4/029* (2018.02)

(58) Field of Classification Search
CPC .............................. G08B 25/14; G08B 25/001
See application file for complete search history.

(56) References Cited

U.S. PATENT DOCUMENTS

| | | | |
|---|---|---|---|
| 5,398,277 A | 3/1995 | Martin, Jr. | |
| 8,830,052 B2 * | 9/2014 | Nakaya | G05B 23/0267 340/521 |
| 9,218,729 B2 * | 12/2015 | Meganathan | G06F 3/04817 |
| 9,984,558 B2 * | 5/2018 | Artes | G08B 29/185 |
| 10,909,839 B1 | 2/2021 | Kursar | |
| 11,595,241 B2 * | 2/2023 | Dziduch | G06F 9/542 |
| 11,908,196 B1 * | 2/2024 | Sundell | G06V 20/44 |
| 12,073,706 B1 * | 8/2024 | Rajkovic | G08B 25/006 |
| 2013/0305103 A1 | 11/2013 | Carey et al. | |

(Continued)

OTHER PUBLICATIONS

International Search Report and Written Opinion, International Patent Application PCT/US2025/014263, 14 pages, Apr. 25, 2025.

*Primary Examiner* — John A Tweel, Jr.
(74) *Attorney, Agent, or Firm* — Finch & Maloney PLLC

(57) ABSTRACT

A method comprises receiving, by a first computing device, a plurality of events, each event including a timestamp and an indicator that corresponds with a location where the corresponding event occurred. The method comprises generating a list of events that occurred at a particular location. The method comprises chronologically ordering the list of events that occurred at the particular location, thereby producing a chronologically ordered list of events. The method comprises allocating the events in the chronologically ordered list into a plurality of alarm incidents, a particular one of the alarm incidents having allocated thereto events that occurred at the particular location. The method comprises receiving, from a second computing device via a network connection, a request for one or more alarm incidents for the particular location. The method comprises after receiving the request, sending, to the second computing device, via the network connection, the particular alarm incident.

20 Claims, 22 Drawing Sheets

(56) References Cited

U.S. PATENT DOCUMENTS

| | | |
|---|---|---|
| 2014/0320312 A1 | 10/2014 | Sager et al. |
| 2015/0154854 A1 | 6/2015 | Morehead |
| 2018/0053394 A1 | 2/2018 | Gersten |
| 2019/0124469 A1 | 4/2019 | Roy |
| 2019/0164412 A1 | 5/2019 | Kennedy-Foster et al. |
| 2020/0105120 A1 | 4/2020 | Werner |
| 2021/0366267 A1 | 11/2021 | Connell et al. |
| 2022/0051548 A1 | 2/2022 | Pellegrini et al. |
| 2022/0198913 A1 | 6/2022 | Thompson et al. |

* cited by examiner

ALARM PLATFORM WITH AGGREGATED ALARM EVENTS

CROSS-REFERENCE TO RELATED APPLICATIONS

This application claims the benefit of U.S. Provisional Patent Application 63/551,860 (filed 9 Feb. 2024), the entire disclosure of which is hereby incorporated by reference herein.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to an alarm platform that provides an aggregation of alarm events and calculated alarm states for the aggregated alarm events. Certain implementations allow important alarm state information to be efficiently communicated to alarm system stakeholders, including customers and alarm system personnel. The alarm state information can be used by an alarm consumer for the triage and handling of an active alarm incident. The alarm state information can also be used by personnel associated with a monitoring center environment and/or a data center environment for quality assurance and other operational improvements.

According to an example, a method comprises receiving, by a first computing device, a plurality of events, each event including a timestamp and an indicator that corresponds with a location where the corresponding event occurred. The method further comprises generating, by the first computing device, from the plurality of events, a list of events that occurred at a particular location. The method further comprises chronologically ordering, based on the timestamps, the list of events that occurred at the particular location, thereby producing a chronologically ordered list of events. The method further comprises allocating the events in the chronologically ordered list into a plurality of alarm incidents, a particular one of the alarm incidents having allocated thereto events that occurred at the particular location. The method further comprises receiving, from a second computing device via a network connection, a request for one or more alarm incidents for the particular location. The method further comprises after receiving the request, sending, to the second computing device, via the network connection, the particular alarm incident.

According to another example, one or more non-transitory computer readable storage media store sequences of instructions executable by one or more processors. The sequences of instructions comprise instructions to receive, by a first computing device, a plurality of events, each event including a timestamp and an indicator that corresponds with a location where the corresponding event occurred. The sequences of instructions further comprise instructions to generate, by the first computing device, a list of events ordered chronologically based on the timestamps. The sequences of instructions further comprise instructions to allocate the events in the list into a plurality of alarm incidents, a particular one of the alarm incidents having allocated thereto events that occurred at a particular location. The sequences of instructions further comprise instructions to receive, from a second computing device via a network connection, a request for one or more alarm incidents for the particular location. The sequences of instructions further comprise instructions to, after receiving the request, send, to the second computing device, via the network connection, the particular alarm incident.

According to another example, a system comprises a memory. The system further comprises a network interface. The system further comprises at least one processor coupled with the memory and the network interface. The at least one processor is configured to receive a plurality of events, each event including a timestamp and an indicator that corresponds with a location where the corresponding event occurred. The at least one processor is further configured to generate a list of events ordered chronologically based on the timestamps, wherein the list of events includes events that occurred at a plurality of locations. The at least one processor is further configured to allocate the events in the list into a plurality of alarm incidents, a particular one of the alarm incidents having allocated thereto events that occurred at a particular one of the plurality of locations. The at least one processor is further configured to receive, from a computing device via the network interface, a request for one or more alarm incidents for the particular location. The at least one processor is further configured to, after receiving the request, send, to the computing device, via the network interface, an identifier for the particular alarm incident.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
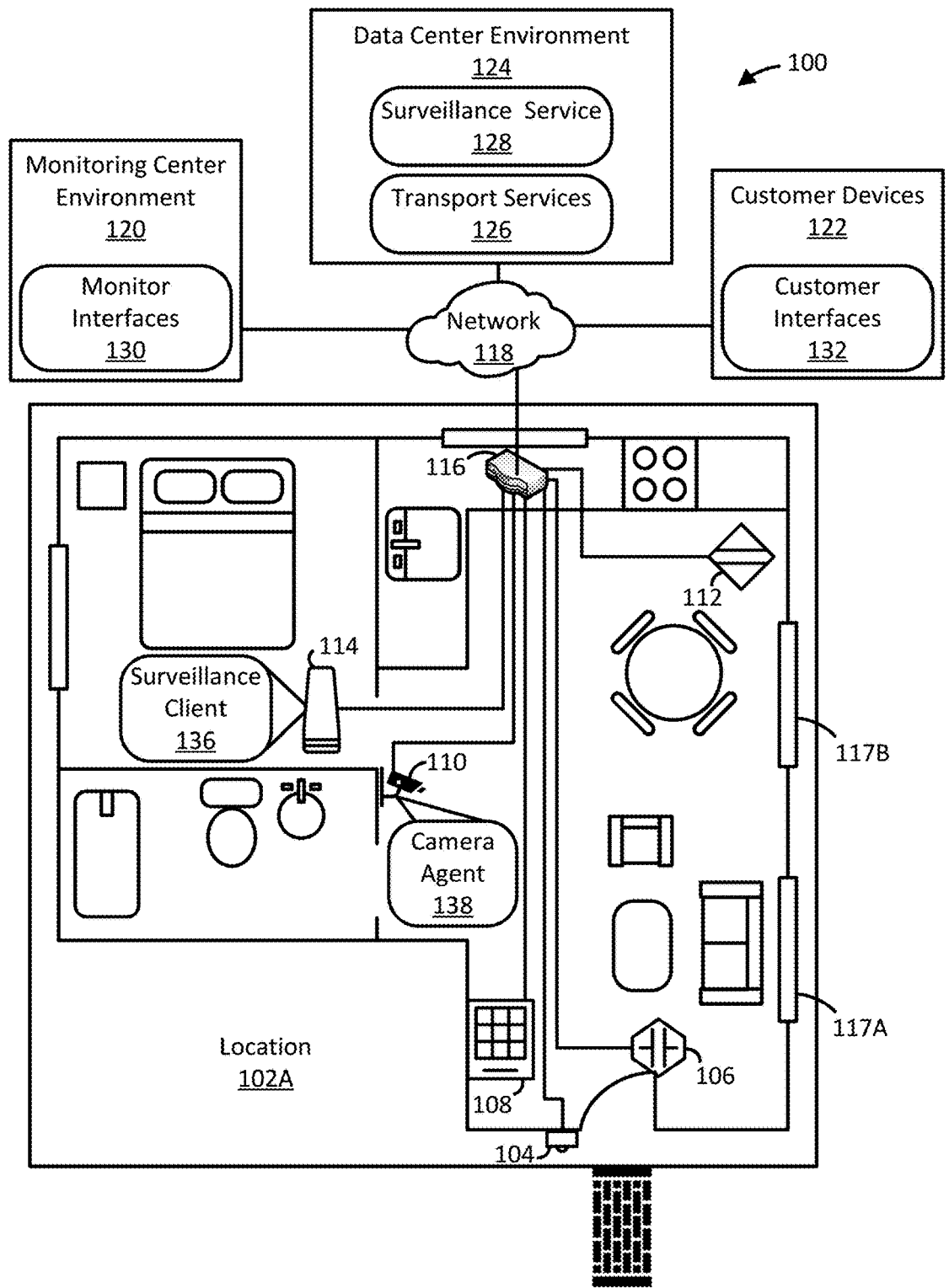
FIG. 1 is a schematic diagram of a security system, according to some examples described herein.

As summarized above, at least some examples disclosed herein are directed to security systems and processes that provide customers with an organized, holistic view of individual alarm incidents raised by the security system and tools helpful to address these alarms. For instance, in some examples, the security systems and processes described herein compile information from a variety of sources into an alarm screen (e.g., a consolidated alarm screen) that includes controls that display events that triggered an alarm and actions taken to address the alarm and controls that enable the customer to take action. The sources tapped to create the consolidated alarm screen include security devices at a location that raised the alarm, computing devices utilized by monitoring personnel, and computing devices utilized by customers. The incorporation of data generated from these diverse sources sets at least some implementations of the consolidated alarm screen apart from other alarm screens that report information from a single, or otherwise limited, set of sources and, thus, provide an incomplete view of the alarm. Further, the actionable controls included in the consolidated alarm screen include buttons to request dispatch of first responders to the location or, alternatively, to cancel the alarm. The unique combination of elements present in some examples of the consolidated alarm screen provide unprecedented transparency regarding actions taken by the various actors involved in addressing alarms and empower the user to contribute to efficient and effective disposition of the alarms.

There are many actors involved in handling alarms. These actors include the overall security system, location-based devices (e.g., cameras and other sensors) included in the security system, customers of the security system, contacts associated with the customers, monitoring personnel who keep watch over locations protected by the security system, dispatchers who interact with the monitoring personnel, and first responders who interact with the dispatchers and visit the locations, to name a few. These actors may work quasi-independently to handle alarms and, in doing so, may interact with various automation, such as mobile phone apps, text messaging, monitoring applications, computer-aided dispatch systems, and other automation.

The actions that can be taken by these actors are sundry. A few specific examples follow. At a monitored location, a sensor other than the sensor that triggered an alarm may be concurrently or subsequently triggered and therefore may supply additional information useful in resolving the alarm. For instance, a motion sensor may be triggered subsequent to a door sensor that triggered the alarm. A customer may disarm their location-based devices. A customer may escalate a priority of the alarm using a panic button. A customer contact may request dispatch of emergency services through a text message. A customer contact may request that the alarm be cancelled via a smartphone app. Monitoring personnel may initiate a call with a customer contact. Monitoring personnel may initiate a live, interactive communication session with someone at the monitored location. Monitoring personnel may request dispatch of a first responder from a dispatcher. Monitoring personnel may cancel a requested dispatch via the dispatcher. A first responder may arrive at the monitored location.

Without context, customers do not know what actions have been taken during an alarm event by the monitoring center to handle the alarm and therefore do not have the requisite information to assist with alarm handling. As an example, one customer contact might be engaged in a phone call with monitoring personnel while another customer contact is considering how to respond to an SMS text message. If monitoring personnel receive contradictory or incorrect information from different customer contacts, then the alarm may not be properly handled, or the resolution thereof might be delayed.

In view of these challenges, as well as others, the security systems and processes described herein aggregate information regarding the activities of the actors set forth above into a consolidated alarm screen that includes a single real-time timeline. In some examples, the consolidated alarm screen is presented to the customer via a customer interface, such as a mobile app, thus providing the customer with insight as to what is being done to handle an alarm and the current state of the alarm. In alarm situations, time is of the essence as wrongdoers can quickly steal or damage customer property. Alternatively, customers may have limited time (e.g., 30 seconds or less) to cancel false alarms and prevent wasteful use of emergency services, such as dispatchers and first responders. The succinct presentation of information described herein regarding the alarm better informs the customer as to the state of an alarm and helps the customer efficiently and properly triage and dispose of the alarm. This feature, in turn, results in more efficient use of emergency services by reducing the number of dispatches that occur to false alarms.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 16). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
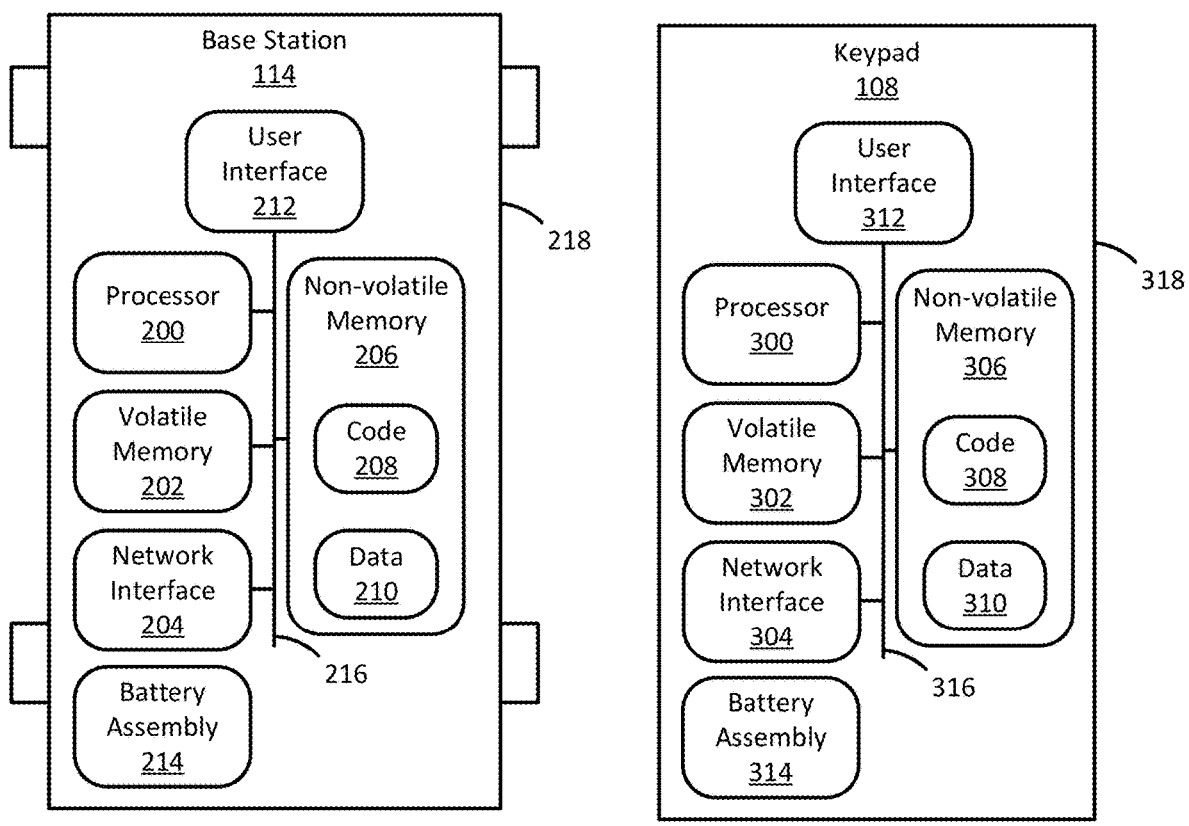
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
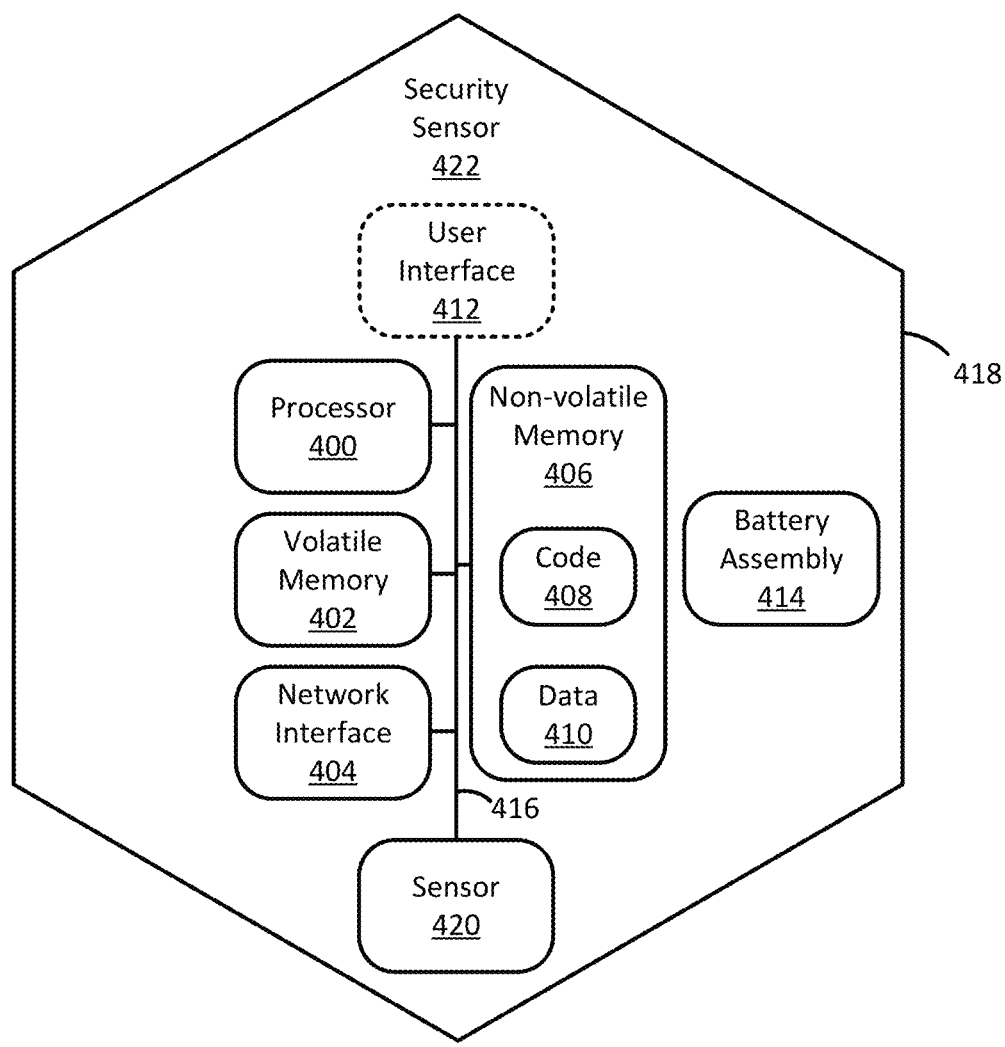
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
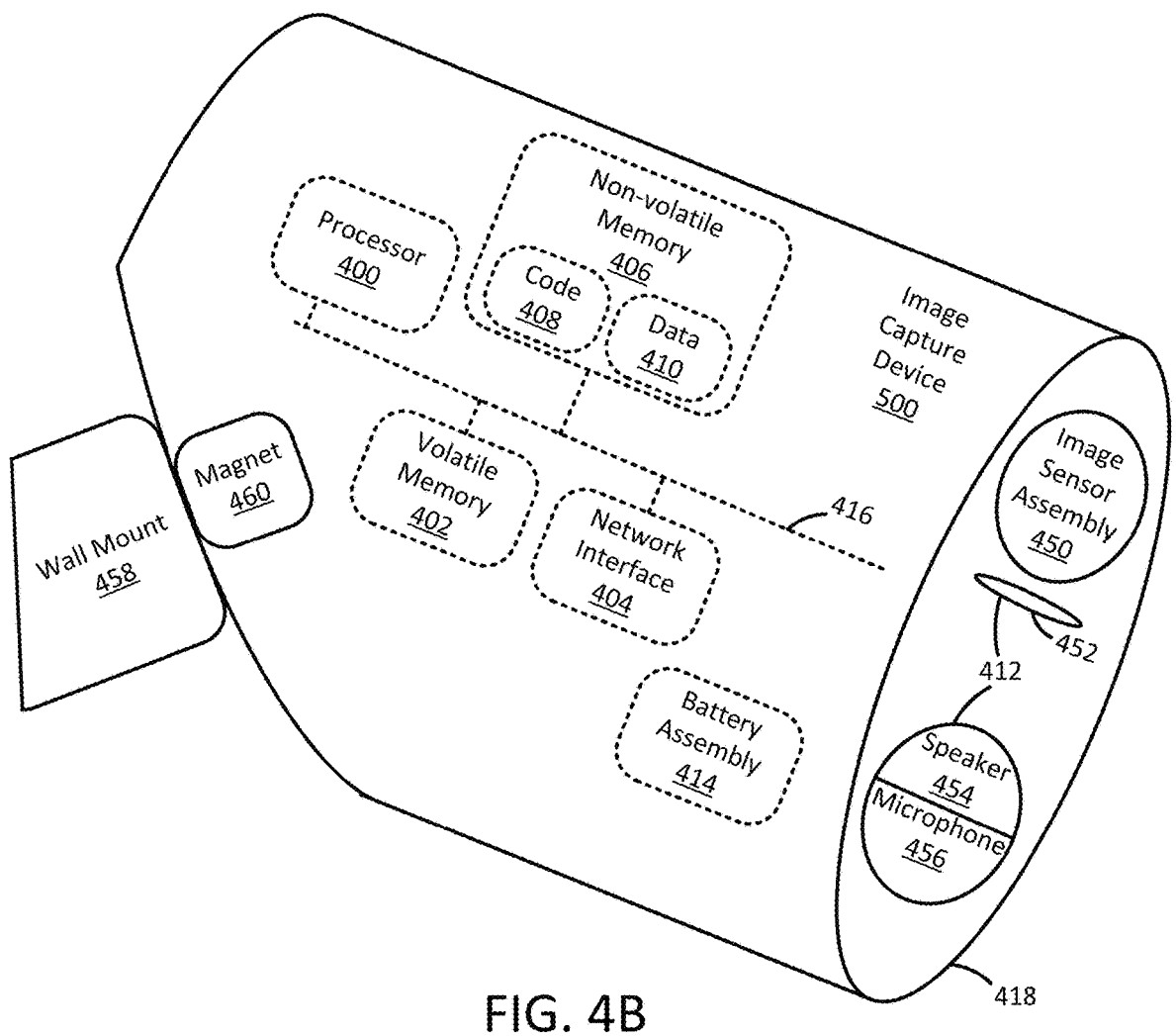
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
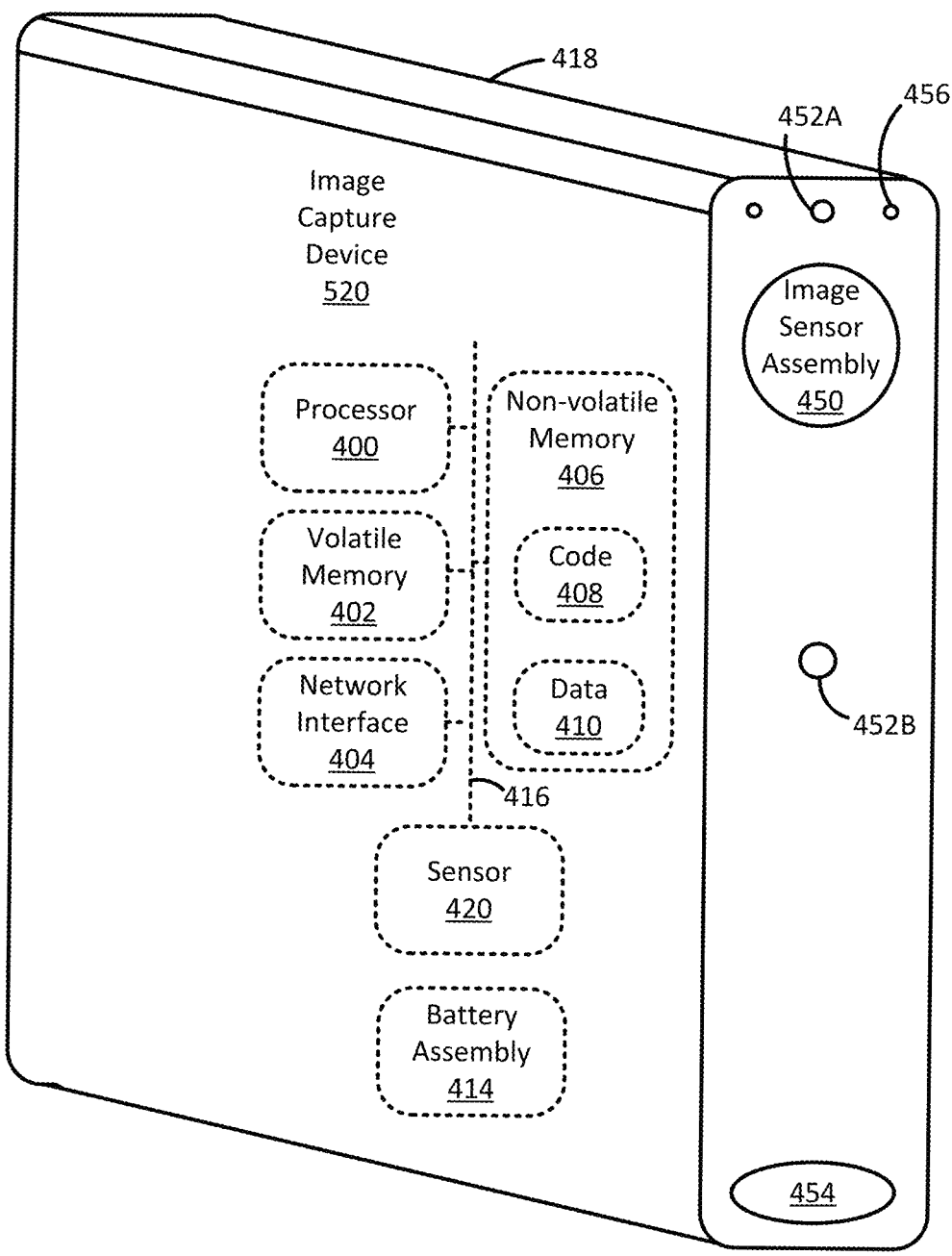
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
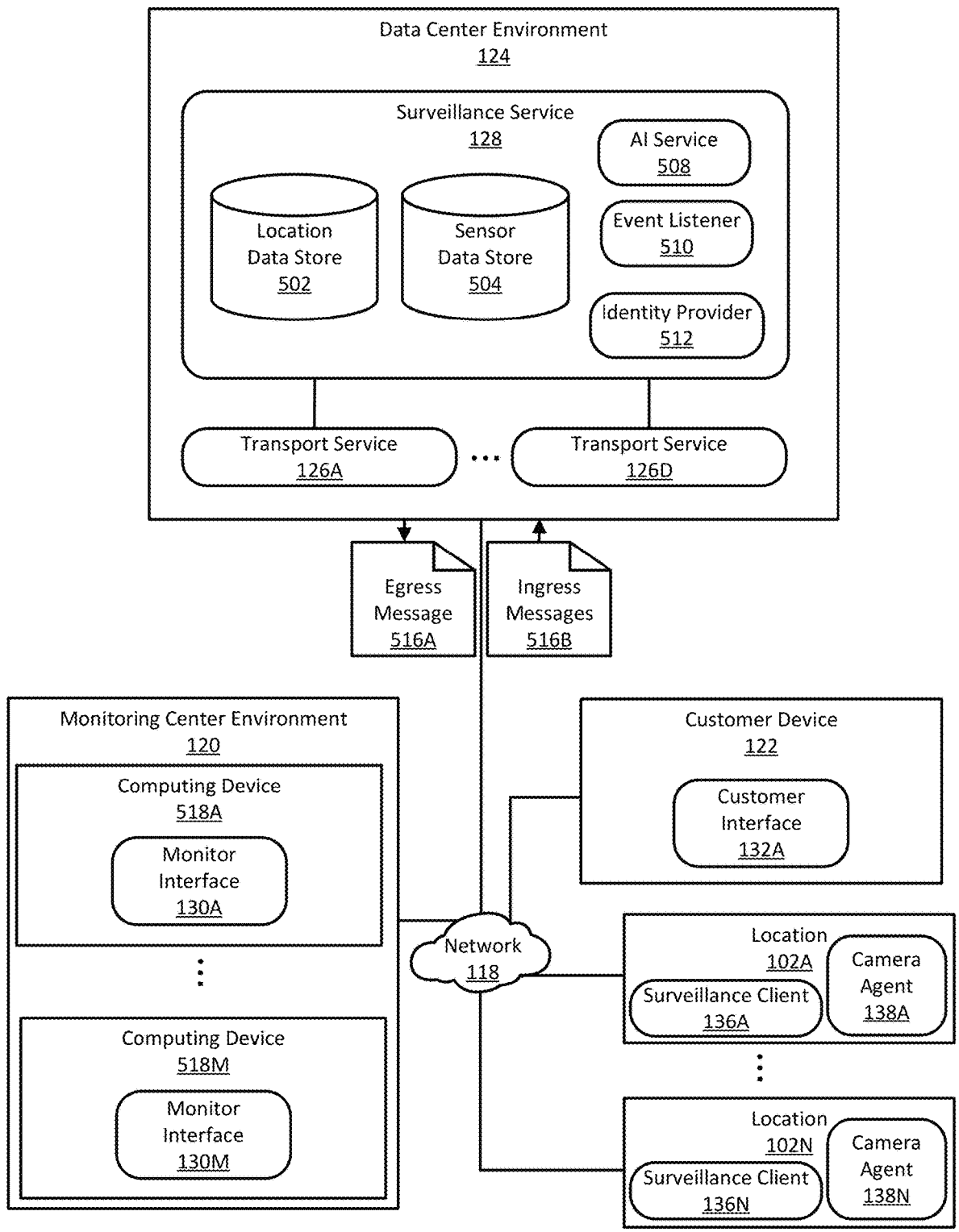
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers (for example, user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
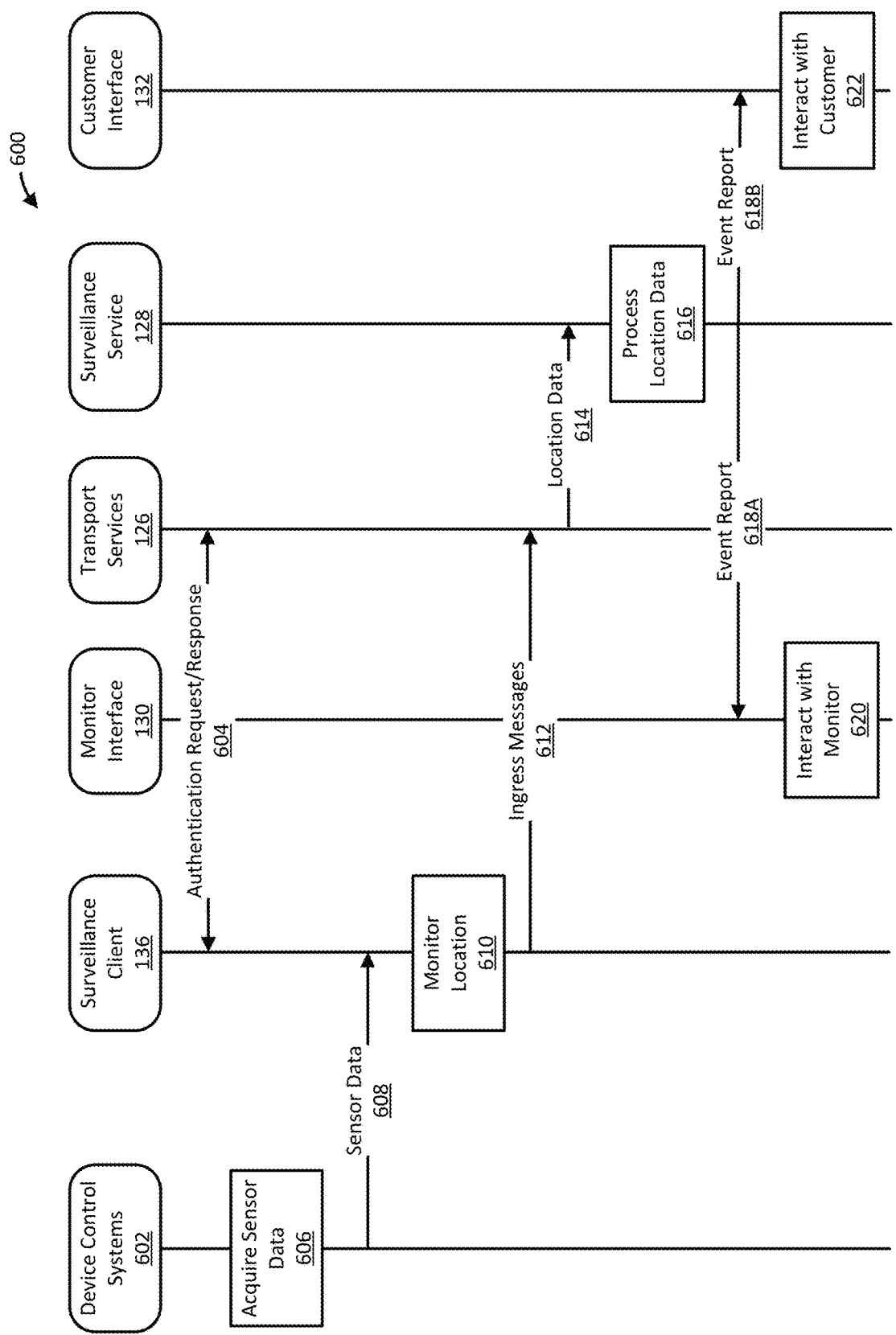
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
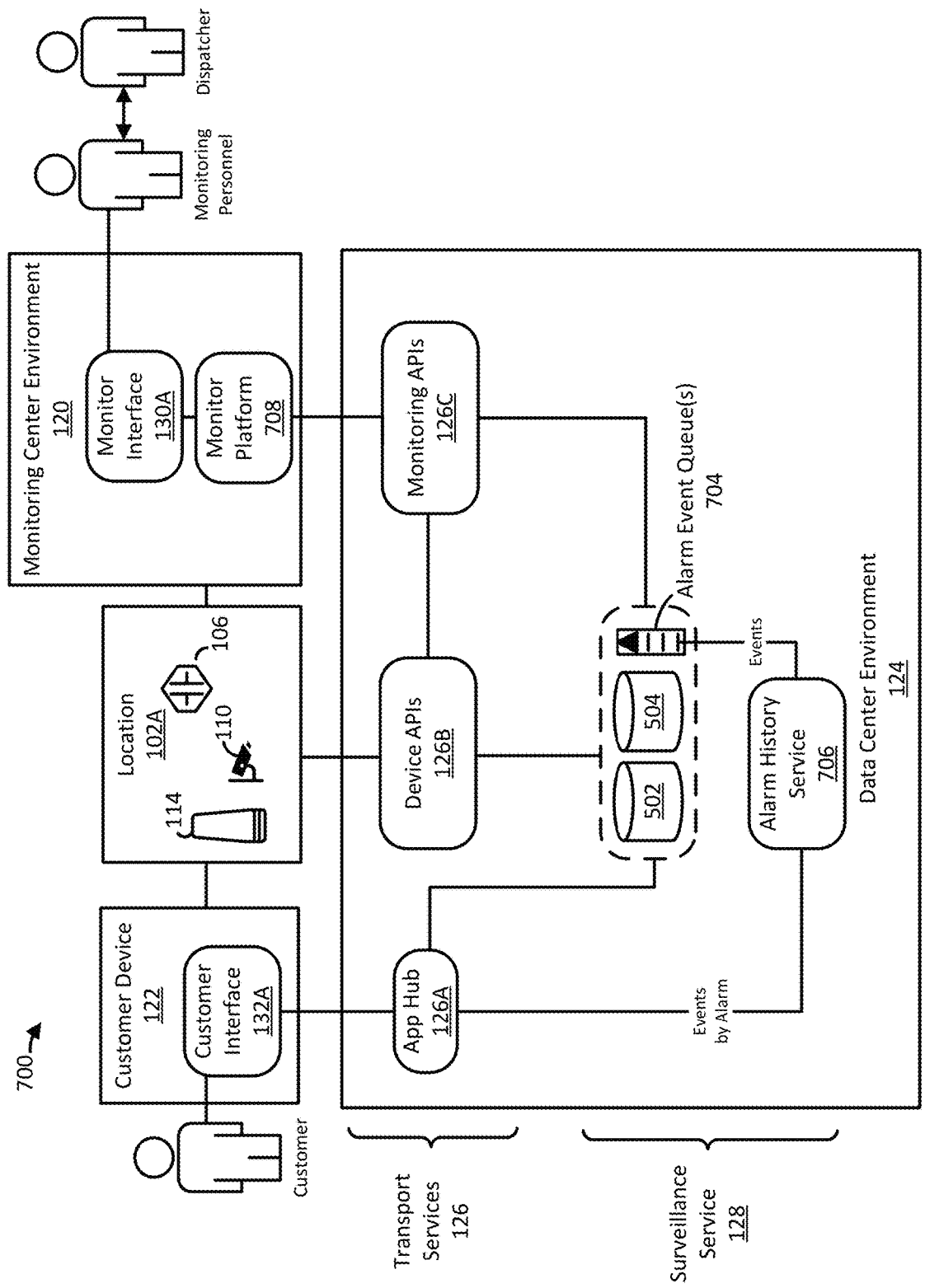
FIG. 7 is a schematic diagram of select portions of the security system of FIG. 1 that are configured to implement a customer interface with a consolidated alarm screen, according to some examples described herein.

Turning now to FIG. 7, parts 700 of a security system (e.g., the security system 100 of FIG. 1) that are configured to implement a customer interface with a consolidated alarm screen are schematically illustrated. These parts include the data center environment 124 of FIG. 1, the monitoring center environment 120 of FIG. 1, one of the customer devices 122 of FIG. 1, and a monitored location 102A of FIG. 1. As shown in FIG. 7, the data center environment 124 hosts portions of the surveillance service 128 including the location data store 502 of FIG. 5, the sensor data store 504 of FIG. 5, one or more alarm event queues 704, and an alarm history service 706. The data center environment 124 optionally includes one or more message queues to persist alarm incident data and relationship data between alarm events and alarm incidents, for example as generated by a alarm lifecycle calculator which will be disclosed in turn. These one or more message queues can also be used by an alarm history service to publish alarm events and alarm incidents. The data center environment 124 further hosts portions of the transport services 126 including an app hub 126A, one or more device APIs 126B, and one or more monitoring APIs 126C. The monitoring center environment 120 includes at least one computing device that hosts a monitor interface 130A and, in this example, at least one computing device that hosts a monitor platform 708. The location 102A includes a base station 114, an image capture device 110, and a sensor 106. The base station 114 may host a surveillance client (e.g., the surveillance client 136 of FIG. 1; not shown in FIG. 7). The image capture device 110 may host a software camera agent (e.g., the camera agent 138 of FIG. 1; not shown in FIG. 7). The sensor 106 may host a DCS (e.g., as described above with reference to FIG. 4A). As will be apparent in view of this disclosure, the location-based devices 114, 110, and 106 are illustrated by way of example only and the location 102A may omit any of these devices or include other devices. Similarly, examples illustrated by FIG. 7 are not limited to a single customer device 122, location 102A, or monitoring center environment 120. In general, the monitor platform 708 may be collocated with the monitoring center (as illustrated in FIG. 7), collocated with the rest of the surveillance service (as part of data center environment 124), or independently hosted.

Figure 8:
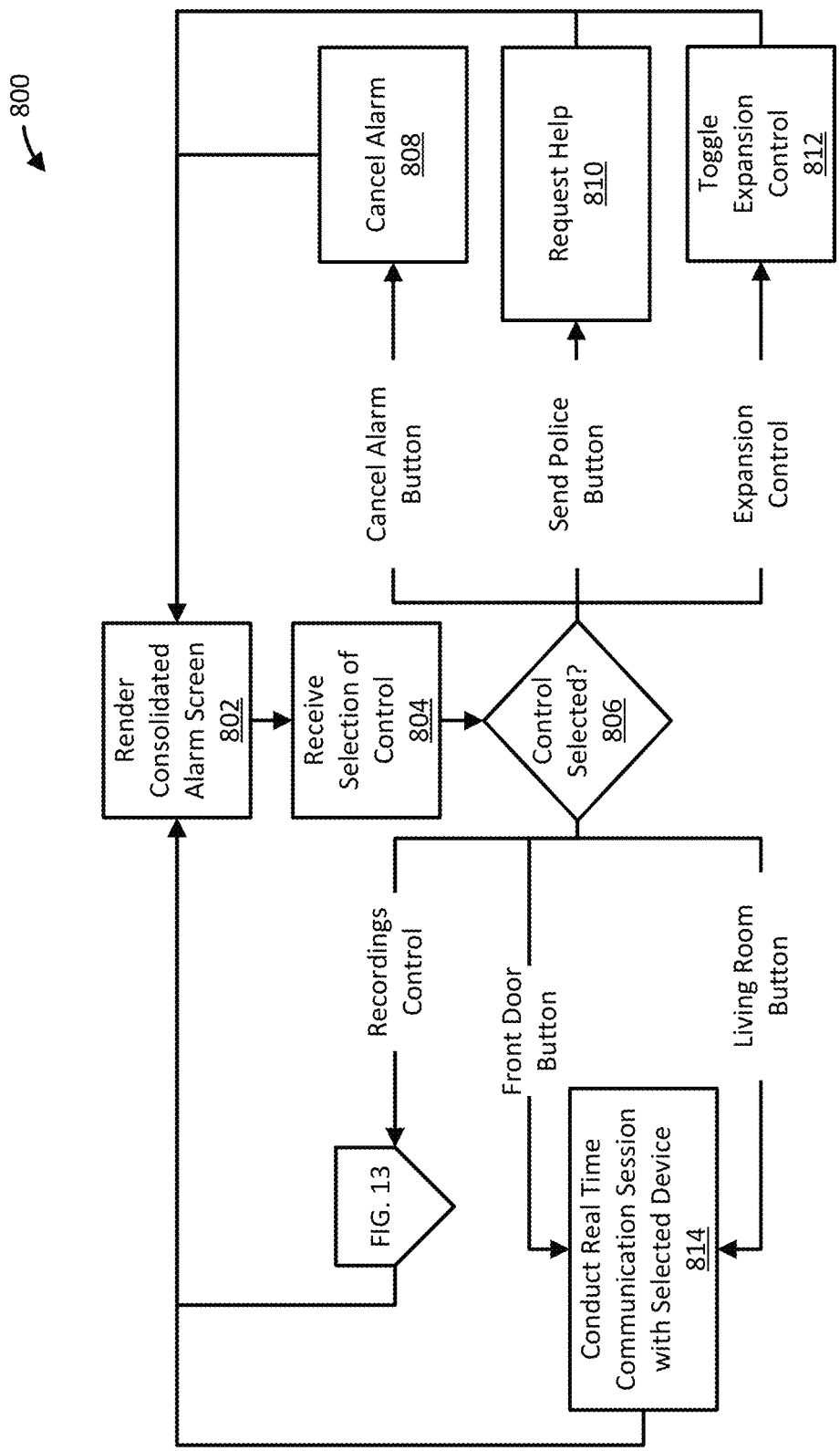
FIG. 8 is a flow diagram illustrating a process for provisioning and handling of a consolidated alarm screen, according to some examples described herein.
Figure 9:
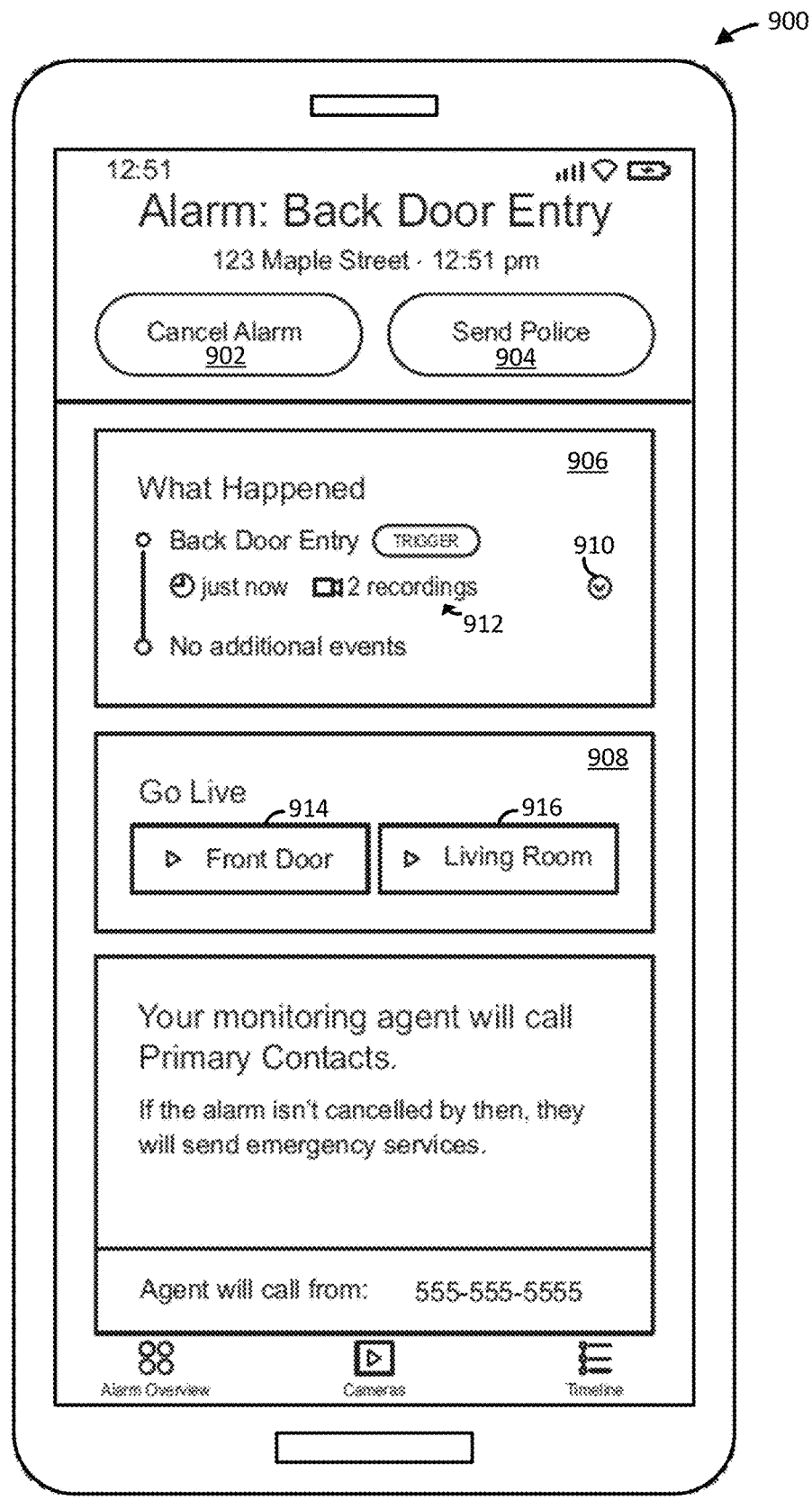
FIG. 9 is a front view of a consolidated alarm screen, according to some examples described herein.

As shown in FIG. 7, the customer interface 132A comprises an application ("app") that is hosted by the customer device 122. In some examples, the customer interface 132A is configured to interact with a customer to both receive input and render output regarding aspects of the security system accessible to the customer. For instance, in certain examples, the customer interface 132A is configured to control its host to render a consolidated alarm screen with controls configured to display a chronology of actions taken by the various actors involved in handling an alarm. This chronology can include information such as an event that triggered the alarm, events that occurred subsequent to the triggering event, and a current status of the alarm. In certain examples, the consolidated alarm screen also includes additional controls configured to enable a customer to take actions related to the alarm, such as accessing video recordings related to the alarm (e.g., as may be stored in the location data store 502 and/or the sensor data store 504), requesting help regarding the alarm, and canceling the alarm, both with regard to location-based devices and remote monitoring personnel. FIG. 9, which is described further below, illustrates one example of a consolidated alarm screen 900 that a device hosting the customer interface 132A can render in some examples. Examples of processes that the customer interface 132A is configured to implement in various examples are described further below with reference to FIGS. 8-15.

Continuing with the example of FIG. 7, the location-based devices 114, 110, and 106 are configured to detect events (e.g., reportable events) that occur within the location 102A and communicate messages regarding the events and other location data to the surveillance service 128 via the device APIs 126B. This other location data can include, for example, audio-visual sensor data acquired by the image capture device and arm/disarm events processed by the location-based devices. Table 1 lists examples of types of events that the location-based devices are configured to communicate to the surveillance service 128 according to some examples.

TABLE 1

| Reportable Event | Description |
| --- | --- |
| Panic_Button | This event is reported if an alarm is triggered by user selection of a panic button associated with the location. |
| Alarm | This event is reported if the base station enters an alarm state due to reception of a trigger signal from an armed location-based device (e.g., a contact sensor, glass break sensor, motion sensor, camera, etc.). |
| Alarm_Stopped | This event is reported if a "stoppable" alarm (e.g., an alarm triggered by detection of an occurrence other than a human threat) is stopped. Examples of "stoppable" alarms include carbon-monoxide alarms, smoke alarms, water/moisture alarms, temperature/freeze alarms, and the like. |
| Medical_Alarm | This event is reported if an alarm is triggered by user selection of a medical alarm, such as via a keypad, key fob, or panic button. |
| Fire_Alarm | This event is reported if an alarm is triggered by user selection of a fire alarm, such as via a keypad, key fob, or panic button or a sensor detecting a fire, such as a smoke detector. |
| Power_Event | This event is reported if a change to line power is detected. |
| Camera_Event | This event is reported if an alarm is triggered by an image capture device, such as may occur by detection of motion, a human threat, or the like. |

TABLE 1-continued

| Reportable Event | Description |
| --- | --- |
| Cancel_Alarm | This event is reported if an alarm is canceled (e.g., by a user via a location-based device, the customer interface, or the monitor interface). |
| System_Off | This event is reported if the location-based devices are disarmed. |
| System_Home | This event is reported if the location-based devices are selectively armed and disarmed according to a set of user preferences that accommodate a user's physical presence at the location. |
| System_Away | This event is reported if the location-based devices are armed. |
| Personnel_Actions | This event is reported if monitoring personnel access any of the location-based devices. |

Continuing with the example of FIG. 7, the monitor interface 130A comprises a browser-based application and/or portal hosted by computing devices within the monitoring center environment 120 and served by the monitor platform 708. For example, in one implementation the monitor interface 130A comprises a combination of an application provided by the monitoring service provider that interacts with the monitoring platform, and a browser-based extension for video verification that interacts with the data center environment. The monitor interface 130A is configured to interact with monitoring personnel to both receive input and render output regarding alarms triggered at monitored locations, such as the location 102A. For instance, in some examples, the monitor interface 130A is configured to notify monitoring personnel of the occurrence of alarms at monitored locations, render audio-visual data and other sensor data collected by location-based devices at the monitored locations and stored in the data stores 502 and/or 504, and establish real time connections with location-based devices. Further, in some examples, the monitor interface 130A includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Safety Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions are handled by the monitor platform 708, which may then translate them into events that are communicated to the surveillance service 128 via the monitoring APIs 126C. Table 2 lists examples of types of events that monitor interface 130A is configured to communicate to the surveillance service 128 according to some examples.

TABLE 2

| Reportable Event | Description |
| --- | --- |
| Alarm_Accessed | This event is reported if the monitor interface receives input specifying monitoring personnel began handling an alarm. |
| Alarm_Verified | This event is reported if the monitor interface receives input specifying monitoring personnel verified authenticity of an alarm. |
| Dispatch_Fire | This event is reported if the monitor interface receives input specifying that fire department personnel were dispatched to a location. |
| Dispatch_Medical | This event is reported if the monitor interface receives input specifying that emergency medical services were dispatched to a location. |
| Dispatch_Police | This event is reported if the monitor interface receives input specifying that police department personnel were dispatched to a location. |
| Dispatch_Update | This event is reported if the monitor interface receives input specifying an update to dispatch status (e.g., initiated, on-site, canceled, completed, etc.). |
| Customer_Contact | This event is reported if the monitor interface receives input specifying monitoring personnel interacted with a customer or customer contact. |
| Customer_Contact_Failed | This event is reported if the monitor interface receives input specifying monitoring personnel were unable to reach a customer or customer contact. |
| Invalid_Safeword | This event is reported if the monitor interface receives input specifying a customer or customer contact responded to a security challenge with an unrecognized response. |

TABLE 2-continued

| Reportable Event | Description |
| --- | --- |
| Threat_Contact | This event is reported if the monitor interface receives input specifying monitoring personnel interacted (e.g., within a real time communication session via a location-based device) with a threat at the location. |
| Alarm_Update | This event is reported if the monitor interface receives input specifying an update to alarm status (e.g., triggered, under investigation, cancelled, completed, etc.). |

Examples of processes that the monitor interface 130A is configured to implement in various examples are described further below with reference to FIG. 15.

Continuing with the example of FIG. 7, the monitor platform 708 is configured to interoperate with a plurality of monitor interfaces, including the monitor interface 130A. In some examples where the monitor interface 130A is a browser-based application, the monitor platform 708 serves the monitor interface 130A to a browser executing on a computing device accessible by monitoring personnel. Alternatively or additionally, in certain examples, the monitor platform 708 operates as a service to a specialized, native version of the monitor interface 130A executing on the computing device accessible by monitoring personnel. Regardless of its particular method of implementation, the monitor platform 708 exchanges messages with the monitor interface 130A to drive workflows conducted by monitoring personnel (e.g., reviewing alarms raised at monitored locations, contacting monitoring service customers, contacting dispatchers, following up on alarms, canceling false alarms, closing out fully addressed alarms, etc.). In some examples, the monitor platform 708 includes an alarm queue that stores data representative of alarms currently being handled by monitoring personnel. In these examples, the alarm queue may identify individual alarms and may prioritize the alarms for urgency in handling, relative to one another.

As shown in FIG. 7, the monitor platform 708 is further configured to interoperate with the monitoring APIs 126C. For instance, in some examples, the monitor platform 708 is configured to exchange messages with the monitoring APIs 126C that generate events (e.g., reportable events). These events may result, for example, from actions taken by monitoring personnel as part of the workflows they perform. These events may include, for instance, initiation or escalation of an alarm initiated by monitoring personnel. Examples of processes that the monitor platform 708 is configured to implement in various examples are described further below with reference to FIGS. 11-12B.

Continuing with the example of FIG. 7, the app hub 126A is configured to interoperate with the customer interface 132A to exchange ingress messages (e.g., the ingress messages 516B of FIG. 5) and egress messages (e.g., the egress messages 516A of FIG. 5) with the customer interface 132A. For instance, in some examples, the app hub 126A establishes a WebSocket connection with the customer interface 132A, and the two processes communicate the ingress and egress messages therein. Alternatively or additionally, at least some of the ingress and egress messages are communicated via API (e.g., REST API) calls. The ingress and egress messages may include location data specifying alarms and any of the events associated therewith, as described herein, as well as requests to cancel an alarm or send help to a location. More particularly, in some examples, the app hub 126A interoperates with both the customer interface 132A and the alarm history service 706 to supply the consolidated alarm screen 900 described further below with reference to FIG. 9 with a comprehensive list of events related to a particular alarm. This list may include, for example, a sequence of events ordered by timestamp. Examples of processes that the app hub 126A is configured to implement in various examples are described further below with reference to FIGS. 10-12B.

Continuing with the example of FIG. 7, the device APIs 126B are configured to interoperate with the location-based devices 114, 110, and 106 at the location 102A to exchange ingress messages (e.g., the ingress messages 516B of FIG. 5) and egress messages (e.g., the egress messages 516A of FIG. 5) with the location-based devices 114, 110, and 106. For instance, in some examples, the device APIs 126B establish WebSocket connections with DCS processes hosted by the location-based devices 114, 110, and/or 106, and the connected DCS processes communicate the ingress and egress messages via the WebSocket connections. The ingress and egress messages may include data specifying alarms and any of the events associated therewith, as described herein. In some examples, the device APIs 126B are further configured to interoperate with the data stores 502 and/or 504 to store event and/or sensor data received from the location 102A. In these examples, the device APIs 126B are also configured to interoperate with the alarm event queues 704 to place certain events (e.g., reportable events) thereon for processing by the alarm history service 706. These events can be utilized by the alarm history service 706 to build comprehensive lists of events related to particular alarms. Examples of processes that the device APIs 126B are configured to implement in various examples are described further below with reference to FIGS. 12A and 12B.

Continuing with the example of FIG. 7, the monitoring APIs 126C are configured to interoperate with the monitor platform 708 at the monitoring center environment 120 to exchange ingress messages (e.g., the ingress messages 516B of FIG. 5) and egress messages (e.g., the egress messages 516A of FIG. 5) with the monitor platform 708. For instance, in some examples, the monitoring APIs 126C establish WebSocket connections with the monitor platform 708, and the connected processes communicate the ingress and egress messages via the WebSocket connection. The ingress and egress messages may include data specifying alarms and any of the events associated therewith, as described herein. In some examples, the monitoring APIs 126C are further configured to interoperate with the data stores 502 and/or 504 to manipulate event and sensor data received from the location 102A. In these examples, the monitoring APIs 126C are also configured to interoperate with the alarm event queues 704 to place certain events thereon for processing by the alarm history service 706. These events can be utilized by the alarm history service 706 to build comprehensive lists of events related to particular alarms. Examples of processes that the monitoring APIs 126C are configured to implement in various examples are described further below with reference to FIGS. 11-12B. It should be noted that, in some examples, the monitoring APIs 126C support the Automated Secure Alarm Protocol and are configured to receive messages including events from computer-aided dispatch systems operated by PSAPs and to add the events to the alarm event queues 704.

Continuing with the example of FIG. 7, the one or more alarm event queues 704 includes one or more data structures and, in certain examples, surrounding services that support enqueuing and dequeuing of member data structures that house events (e.g., reportable events). The alarm event queues may be implemented using any of a variety of queuing technologies such as KAFKA, IBM MQ, and AMAZON MQ to name a few. In some examples, the one or more alarm event queues 704 include a first queue for events inbound from the device APIs 126B, a second queue for events inbound from the monitoring APIs 126C, a third queue for events outbound from the alarm history service 706, and a fourth queue for alarm states outbound from the alarm history service 706. Examples of processes that the alarm event queues 704 are configured to implement in various examples are described further below with reference to FIG. 10.

Continuing with the example of FIG. 7, the alarm history service 706 is configured to retrieve events from the alarm event queues 704, organize the events into lists by alarm, and publish the organized lists to the app hub 126A for delivery to the customer interface 132A. In certain examples, the alarm history service 706 maintains and refers to a filter that prevents and/or allows enumerated types of events to be passed to the app hub 126A. Examples of processes that the alarm history service 706 is configured to implement in various examples are described further below with reference to FIG. 10.

As described above, in some examples, a customer interface (e.g., the customer interface 132A of FIG. 7), which may be a smartphone app in certain examples, is configured to implement a consolidated alarm screen. Turning now to FIG. 8, a process 800 implemented by the customer interface, in some examples, to provision a consolidated alarm screen is illustrated. As shown in FIG. 8, the process 800 starts with the customer interface controlling a mobile computing device (e.g., the customer device 122 of FIG. 7) that hosts the customer interface to render 802 a consolidated alarm screen via a touchscreen of the mobile computing device. FIG. 9 illustrates one example of a consolidated alarm screen 900 that can be rendered in some examples. As shown in FIG. 9, the screen 900 includes a cancel button 902, a send police button 904, a chronology control group 906, and a go live control group 908. The chronology control group 906 includes an expansion control 910 and a recordings control 912. The go live control group 908 includes a front door button 914 and a living room button 916.

The controls included in the screen 900 provide a holistic perspective of an alarm to a user. Through these controls a user can identify a device that triggered the alarm, gain access to sensor data that triggered the alarm, review actions taken to address the alarm, ascertain the current status of the alarm and the location-based devices that triggered the alarm, and participate in resolution of the alarm. For instance, in some examples, the user can select the cancel alarm button 902 to initiate an alarm cancellation process as described below with reference to FIGS. 12A and 12B. In some examples, the user can select the send police button 904 to initiate a request help process as described below with reference to FIG. 11.

Figure 14:
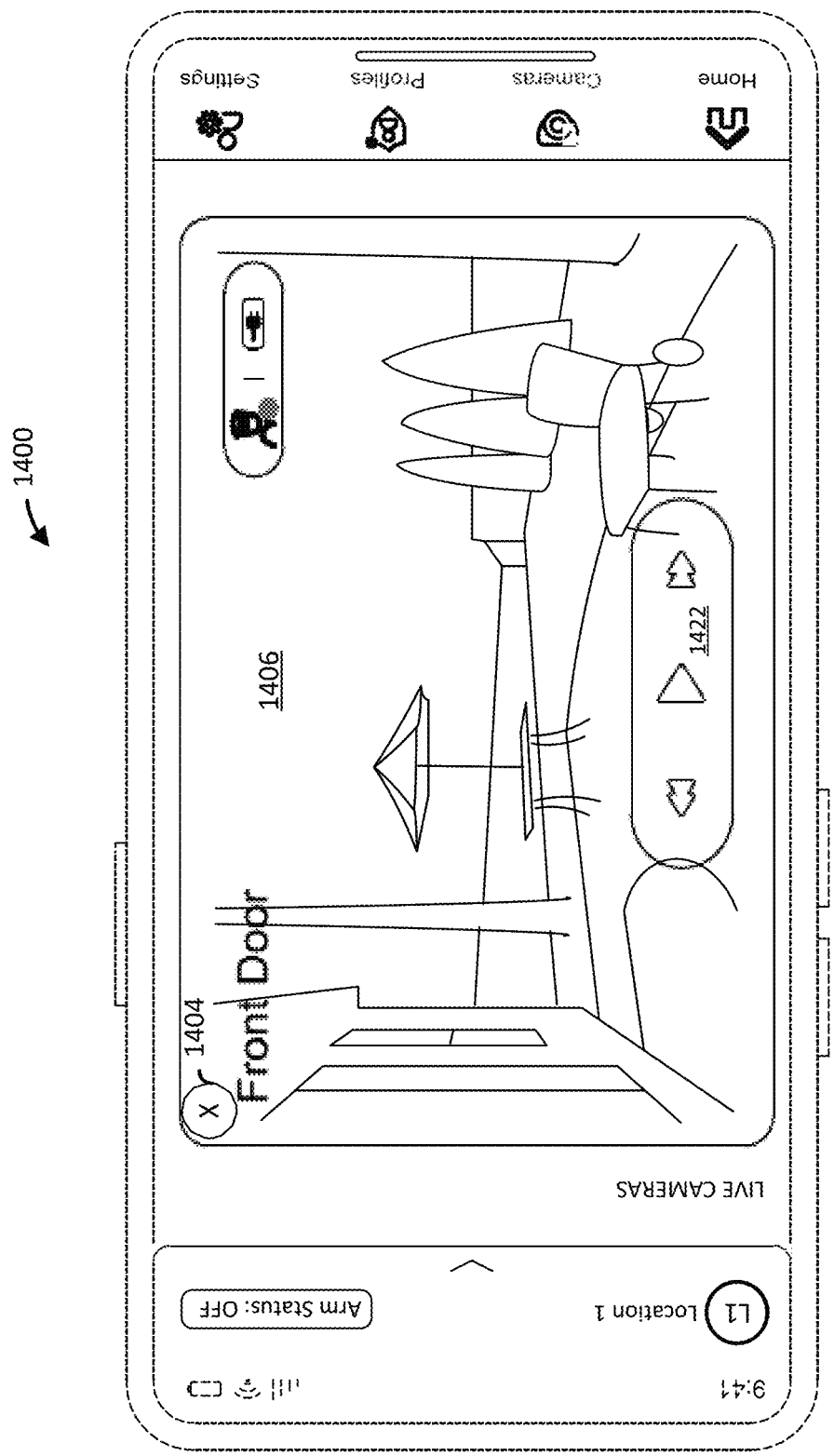
FIG. 14 is a front view of a user interface screen to display content from a camera, according to some examples described herein.

Continuing with the example of FIG. 9, the chronology control group 906 is configured to display a list of events observed and actions taken related to an alarm. In some examples, the user can select the expansion control 910 to toggle the chronology control group 906 between an expanded and contracted state. When the expansion control 910 is in an expanded state, the customer interface devotes more space within the screen 900 to the list of events observed and actions taken. When the expansion control 910 is in a contracted state, the customer interface devotes less space within the screen 900 to the list. As illustrated in FIG. 9, the expansion control 910 is in a contracted state. As shown in FIG. 9, the user can select the recordings control 912 to access sensor data (e.g., audio-visual recordings) that triggered the alarm. FIG. 14, which is described further below, illustrates one example of a camera screen 1400 that the customer interface can control its host device to render in some examples.

Continuing with the example of FIG. 9, the go live control group 908 includes controls that enable the user to establish a real time communication session between the device hosting the customer interface and one or more location-based devices residing at the location at which the alarm was triggered. As shown in FIG. 9, the user can select the front door button 914 to access a camera included in the doorbell of the location and can select the living room button 916 to access a camera associated with the living room at the location. In some examples, the user can interact with (e.g., see and/or speak with) an individual at the location via the real time communication session.

Returning to the process 800 with reference to FIG. 8, the customer interface receives 804 input selecting a control of the screen 900. For instance, in some examples, the customer interface receives a message from an operating system or other code (e.g., a runtime engine of a development platform, a virtual machine, etc.) executing on the mobile computing device. The message may include information regarding an interaction between the touchscreen and a user. For instance, the message may specify a location, duration of contact(s), and any movement detected on the touchscreen. Alternatively or additionally, the message may specify an identifier of a control of the home screen and a type of selection (e.g., a tap, a double tap, a swipe, a long press, etc.).

Continuing with the process 800, the customer interface determines 806 which control is selected by the input. For instance, in some examples, the customer interface identifies the control of the screen 900 selected and the type of selection based on the received message. In some examples, the customer interface makes this determination by identifying the location specified in the message as being within an area of the touchscreen occupied by the control and by classifying the selection type using the duration of contact(s) specified in the message. Alternatively or additionally, the customer interface may make this determination by reading an identifier of the control and the type of selection from the message.

Continuing with the process 800, if the customer interface determines that the cancel button 902 is selected, the customer interface initiates 808 an alarm cancellation process, such as the alarm cancellation process described further below with reference to FIGS. 12A and 12B. If the customer interface determines that the send police button 904 is selected, the customer interface initiates 810 a request help process as described below with reference to FIG. 11. If the customer interface determines that the expansion control 910 is selected, the customer interface toggles 812 the state of the expansion control and controls the mobile computing device to re-render the screen 900. If the customer interface determines that the recordings control 912 was selected, the customer interface initiates a recording review process by provisioning a camera screen. One example of a camera screen provisioning process is described further below with reference to FIG. 13. If the customer interface determines that either the front door button 914 or the living room button 916 is selected, the customer interface initiates 814 a real time communication session between the mobile computing device and the location-based device associated with the selected button.

Figure 10:
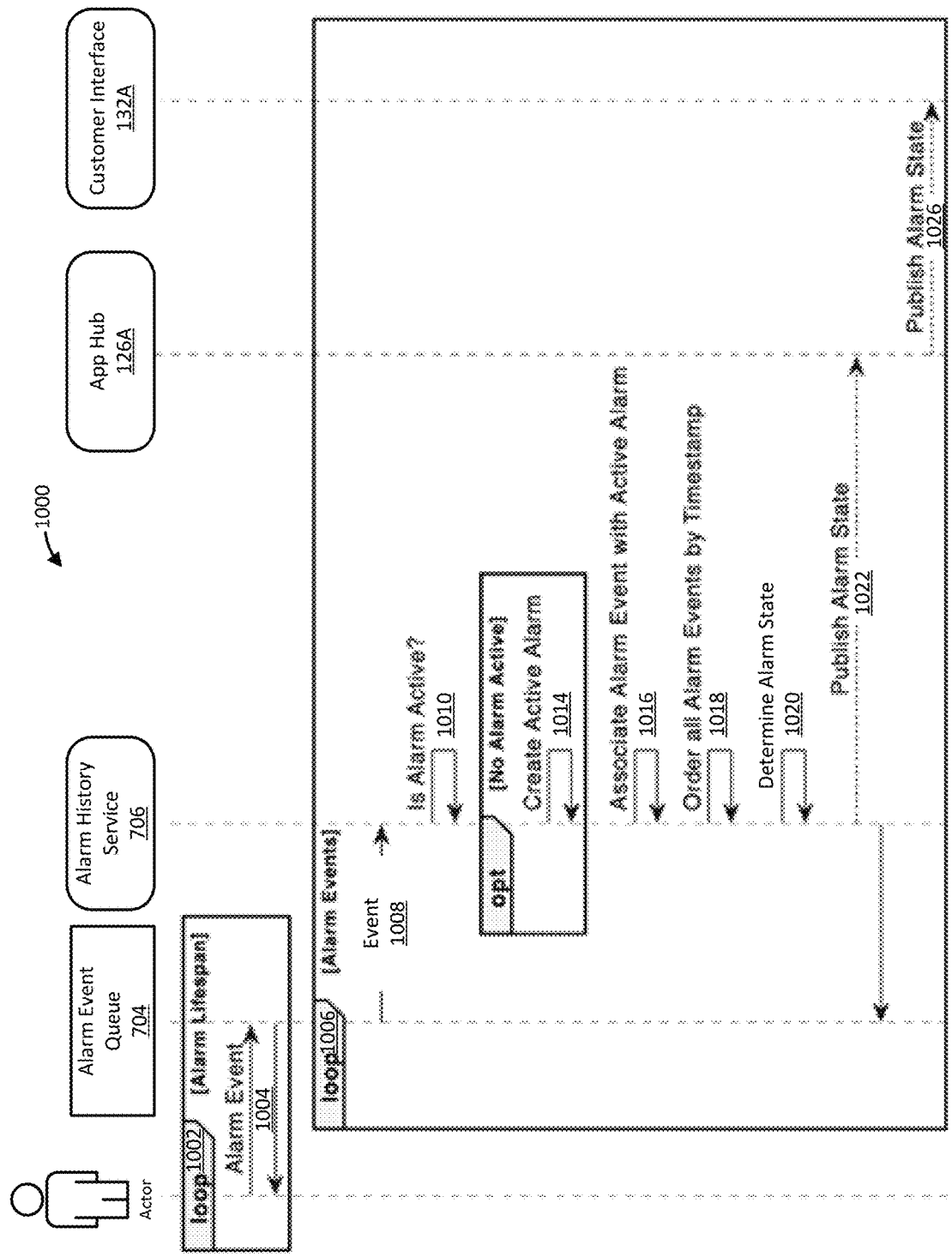
FIG. 10 is a sequence diagram illustrating an alarm generation process, according to some examples described herein.

Turning now to FIG. 10, a reporting process 1000 that supplies a consolidated alarm screen (e.g., the screen 900 of FIG. 9) with a comprehensive list of events related to a particular alarm is illustrated as a sequence diagram. The process 1000 can be executed, in some examples, by a security system (e.g., the security system 100 of FIG. 1). More specifically, in some examples, at least a portion of the process 1000 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1000 is executed by a customer device (e.g., the customer device 122 of FIG. 7) under control of a customer interface (e.g., customer interface 132A of FIG. 7).

As shown in FIG. 10, the process 1000 starts with a loop 1002 in which an alarm event queue (e.g., one or more of the alarm event queues 704 of FIG. 7) repeatedly receives 1004 one or more reportable events as a result of actors interacting with parts of the security system. Examples of an interaction that may result in the one or more events being added to the alarm event queue include an interaction between a customer and the customer interface, an interaction between monitoring personnel and a monitor interface (e.g., the monitor interface 130A of FIG. 7), and an interaction (albeit voluntary or involuntary) between an individual at the location 102A and one of the location-based devices 114, 110, and 106. The events that can be added to the queue include any of the events described herein. In some examples, individual instance of the loop 1002 execute until handling of the alarm that initiated the individual instance is complete.

Continuing with the process 1000, another loop 1006 iterates through a sequence of operations in which events are processed and published to subscribers, such as the customer interface 132A. As shown in FIG. 10, the loop 1006 starts with the alarm event queue communicating an event 1008 to an alarm history service (e.g., the alarm history service 706 of FIG. 7). For instance, in some examples, the alarm event queue sends a message specifying or identifying the event 1008 to the alarm history service. The message and/or the event 1008 may specify a location from which the event 1008 originated.

Continuing with the process 1000, the alarm history service determines 1010 whether an active alarm has been recorded for the location specified in the message. For instance, in some examples, the alarm history service accesses a data structure stored in memory that lists active alarms by location. In these examples, if the alarm history service is unable to find an active alarm for the location specified in the message within the list, the alarm history service creates 1014 an identifier of an active alarm (also referred to as an "alarm identifier") and stores, within the list, the identifier of the active alarm in association with the location specified in the message.

Continuing with the process 1000, the alarm history service associates 1016 the event 1008 with the active alarm. For instance, in some examples, to associate the event 1008 with the active alarm, the alarm history service stores, within a data structure allocated in memory, a record that includes the event 1008 and the identifier of the active alarm.

Continuing with the process 1000, the alarm history service sorts 1018 events associated with the active alarm by a timestamp associated with individual events. For instance, in some examples, the alarm history service initiates a query that returns events associated with the active alarm and that includes an ORDER BY TIMESTAMP clause to establish a sort order. It should be noted that the timestamp associated with an event may be a current timestamp assigned to the event when the event is created or, if no such timestamp exists for an event, when the event is received by transport services (e.g., the transport services 126 of FIG. 7).

Continuing with the process 1000, the alarm history service determines 1020 an alarm state for the active alarm based on the events associated therewith. For instance, in some examples, the alarm history service calculates a threat score, as described above with reference to FIG. 6 and stores the threat score in association with the active alarm (e.g., stores the threat score in a data structure along with the identifier of the active alarm). Alternatively or additionally, in some examples, the alarm history service determines multiple alarm states within the operation 1020. These states may include a monitoring state, a customer state, a dispatch state, and a disposition state. For instance, in some examples, the alarm history service includes, within the monitoring state, events related to monitoring (e.g., an assignment of the alarm to monitoring personnel, an update generated by monitoring personnel, or another event that indicates engagement by monitoring personnel with information regarding the alarm). The alarm history service may include, within the customer state, events related to customer interaction (e.g., notifications to the customer or customer contacts, verifications of alarm authenticity made by the customer, acknowledgements of existence of the alarm made by the customer, etc.). The alarm history service may include, within the dispatch state, events related to dispatch activity (e.g., notifications to the dispatcher, dispatch status, information regarding first responders, etc.). The alarm history service may include, within the disposition state, events related to ultimate resolution of the alarm (e.g., authentic alarm, false alarm, etc.).

Continuing with the process 1000, the alarm history service stores the alarm state with the active alarm in one or more of the alarm event queues and publishes 1022 the alarm state and the timestamp-ordered list of events associated with the alarm to an app hub (e.g., the app hub 126A of FIG. 7). For instance, in some examples, the alarm history service sends a message to the app hub that identifies the alarm state and the list of events. The app hub, in turn, communicates (e.g., via the WebSocket connection described above) the alarm state and the list of events 1026 to the customer interface for display in a chronology control group (e.g., the chronology control group 906 of FIG. 9). Alternatively or additionally, in some examples, the alarm history service publishes 1022 alarm states and timestamp-ordered lists of events for all alarms, for active alarms by location, and/or for most recent alarms by location. Publication of this information may allow the customer interface to display information regarding the most recent alarm after the alarm is no longer active.

Figure 11:
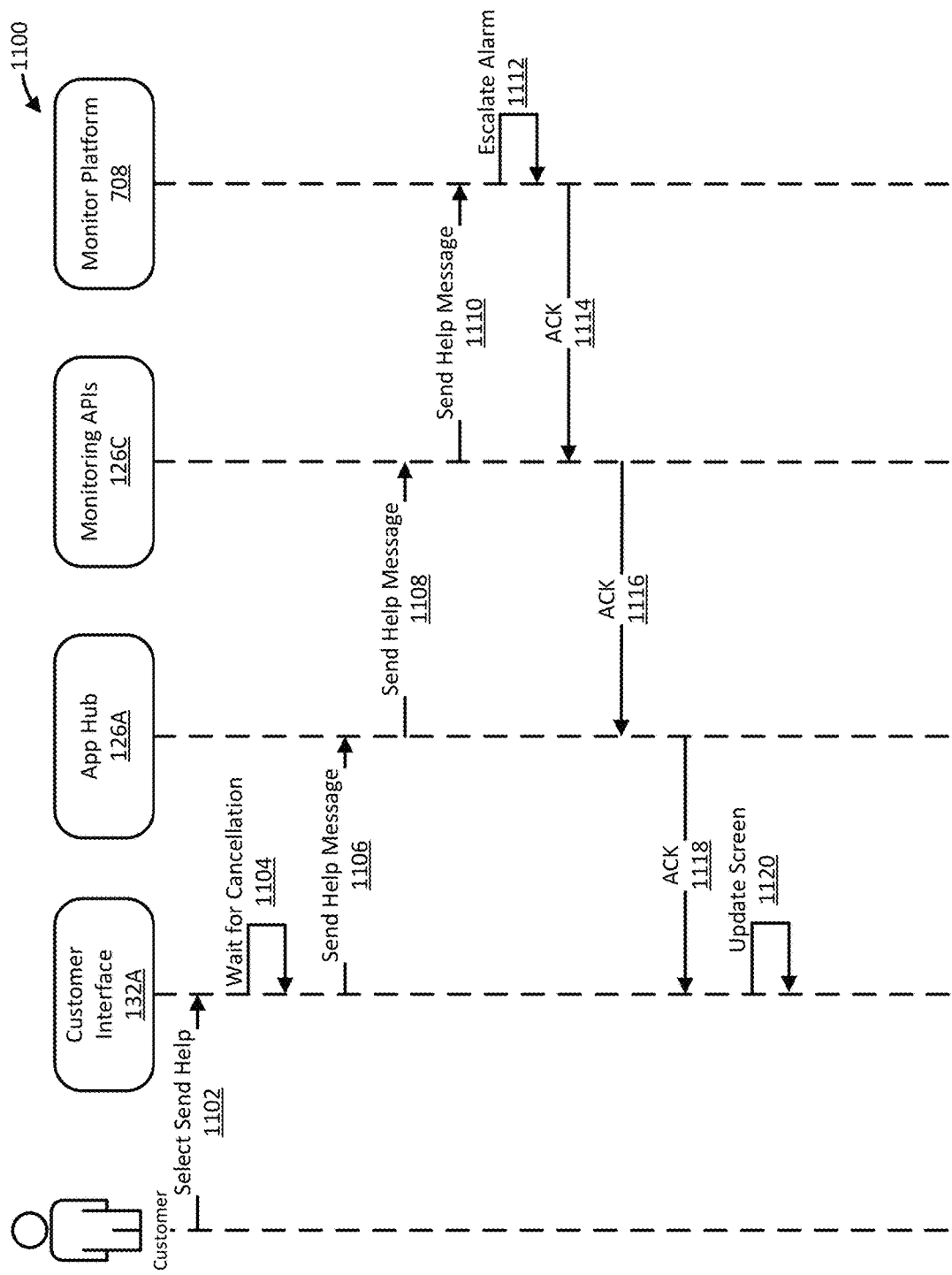
FIG. 11 is a sequence diagram illustrating a help request process, according to some examples described herein.

Turning now to FIG. 11, a help request process 1100 initiated in response to selection of a send police button (e.g., the send police button 904 of FIG. 9) is illustrated as a sequence diagram. The process 1100 can be executed, in some examples, by a security system (e.g., the security system 100 of FIG. 1). More specifically, in some examples, at least a portion of the process 1100 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1100 is executed by a customer device (e.g., the customer device 122 of FIG. 7) under control of a customer interface (e.g., the customer interface 132A of FIG. 7). At least a portion of the process 1100 is executed by a monitoring center environment (e.g., the monitoring center environment 120 of FIG. 7) under control of a monitor platform (e.g., monitor platform 708 of FIG. 7).

As shown in FIG. 11, the process 1100 starts with the customer interface receiving 1102 input from a user that selects the send police button. For instance, in some examples, the customer interface is a customer interface that displays a consolidated alarm screen (e.g., the consolidated alarm screen 900 of FIG. 9) including the send police button, and a customer taps the send police button. In this example, the customer interface receives the tap as a notification from an operating system of the customer device.

Continuing with the process 1100, the customer interface waits 1104 for a configurable amount of time before proceeding to ensure that selection of the send police button was not received in error. For instance, in some examples, the customer interface executes a timer set to expire after a duration equal to the amount of time. The amount of time waited varies between examples and can be 5 seconds, 10 seconds, 15 seconds, or some other amount of time. During this time the customer interface will accept a user instruction to cancel to request.

Continuing with the process 1100, the customer interface communicates a send help message 1106 to an app hub (e.g., the app hub 126A of FIG. 7). For instance, in some examples, the customer interface transmits the message 1106 to the app hub via a WebSocket connection previously established between the two processes. Alternatively, in some examples, the customer interface transmits the message 1106 as a REST POST request. The message 1106 may identify the alarm and the location from which the alarm originated, among other information regarding the alarm.

Continuing with the process 1100, the app hub communicates a send help message 1108 to at least one monitoring API (e.g., one of the monitoring APIs 126C of FIG. 7). For instance, in some examples, the app hub transmits the message 1108 to the monitoring API via one or more inter-process communications. The message 1108 may identify the alarm and the location from which the alarm originated, among other information regarding the alarm.

Continuing with the process 1100, the monitoring API communicates a send help message 1110 to a monitor platform (e.g., the monitor platform 708 of FIG. 7). For instance, in some examples, the monitoring API transmits the message 1110 to the monitor platform via a WebSocket connection between the two processes. The message 1110 may identify the alarm and the location from which the alarm originated, among other information regarding the alarm.

Continuing with the process 1100, the monitor platform escalates 1112 the alarm. For instance, in some examples, the monitor platform increases a priority of the alarm within an alarm queue maintained by the monitor platform. One or more monitor interfaces (e.g., the monitor interface 130A of FIG. 7) may, in response to the increased priority, highlight a representation of the alarm within a GUI presented by the monitor interface. The type of highlighting (bold, underlining, audio accompaniment, etc.) varies between examples and can indicate that the alarm is verified and help from a first responder is requested.

Continuing with the process 1100, the monitor platform acknowledges 1114 receipt and processing of the message 1110. For instance, in some examples, the monitor platform transmits an acknowledgement message to the monitoring API via the WebSocket connection used to communicate the message 1110. The acknowledgement message may identify the send help message being acknowledged.

Continuing with the process 1100, the monitoring API acknowledges 1116 receipt and delivery of the message 1108. For instance, in some examples, the monitor API transmits an acknowledgement message to the app hub via an inter-process communication. The acknowledgement message may identify the send help message being acknowledged.

Continuing with the process 1100, the app hub acknowledges 1118 receipt and delivery of the message 1106. For instance, in some examples, the app hub transmits an acknowledgement message to the customer interface via the WebSocket connection used to communicate the message 1106. The acknowledgement message may identify the send help message being acknowledged.

Continuing with the process 1100, the customer interface updates 1120 the consolidated alarm screen to indicate that selection of the send police button has been processed. For instance, in some examples, the customer interface updates a chronology displayed in a chronology control group (e.g., the chronology control group 906 of FIG. 9) to include an event detailing escalation of the alarm by monitoring personnel. After completion of the operation 1120, the process 1100 may end.

Although the description of the process 1100 focuses on sending police in response to an alarm, it should be noted that other first responders may be sent in response to an alarm, depending on the type of alarm triggered. For instance, a temperature or smoke alarm may be escalated by monitoring personnel to a fire department. In a similar fashion, a medical alarm may be escalated by monitoring personnel to emergency medical services. Other examples will be apparent in light of this disclosure.

Figure 12A:
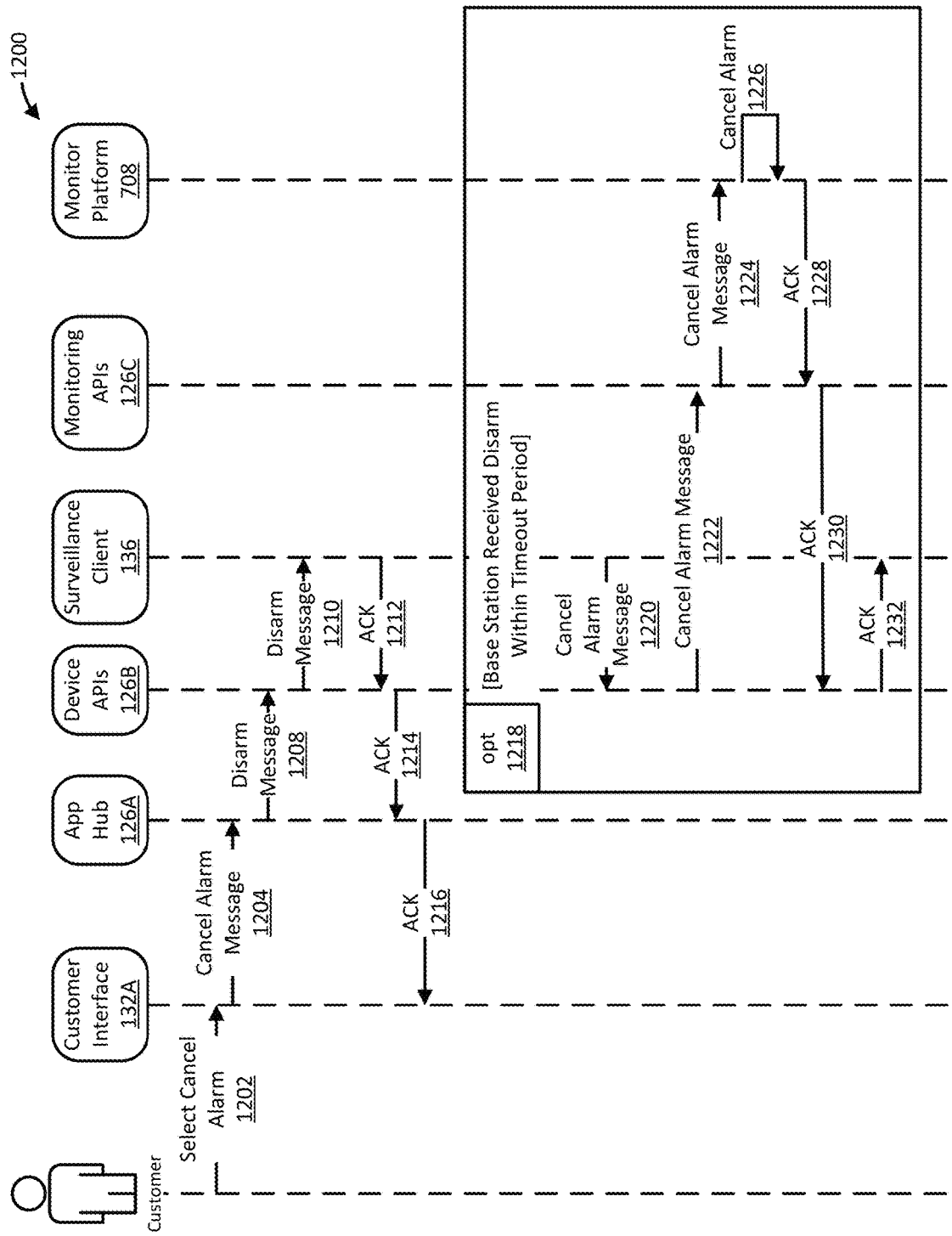
FIGS. 12A and 12B are a sequence diagram illustrating an alarm cancellation process, according to some examples described herein.
Figure 12B:
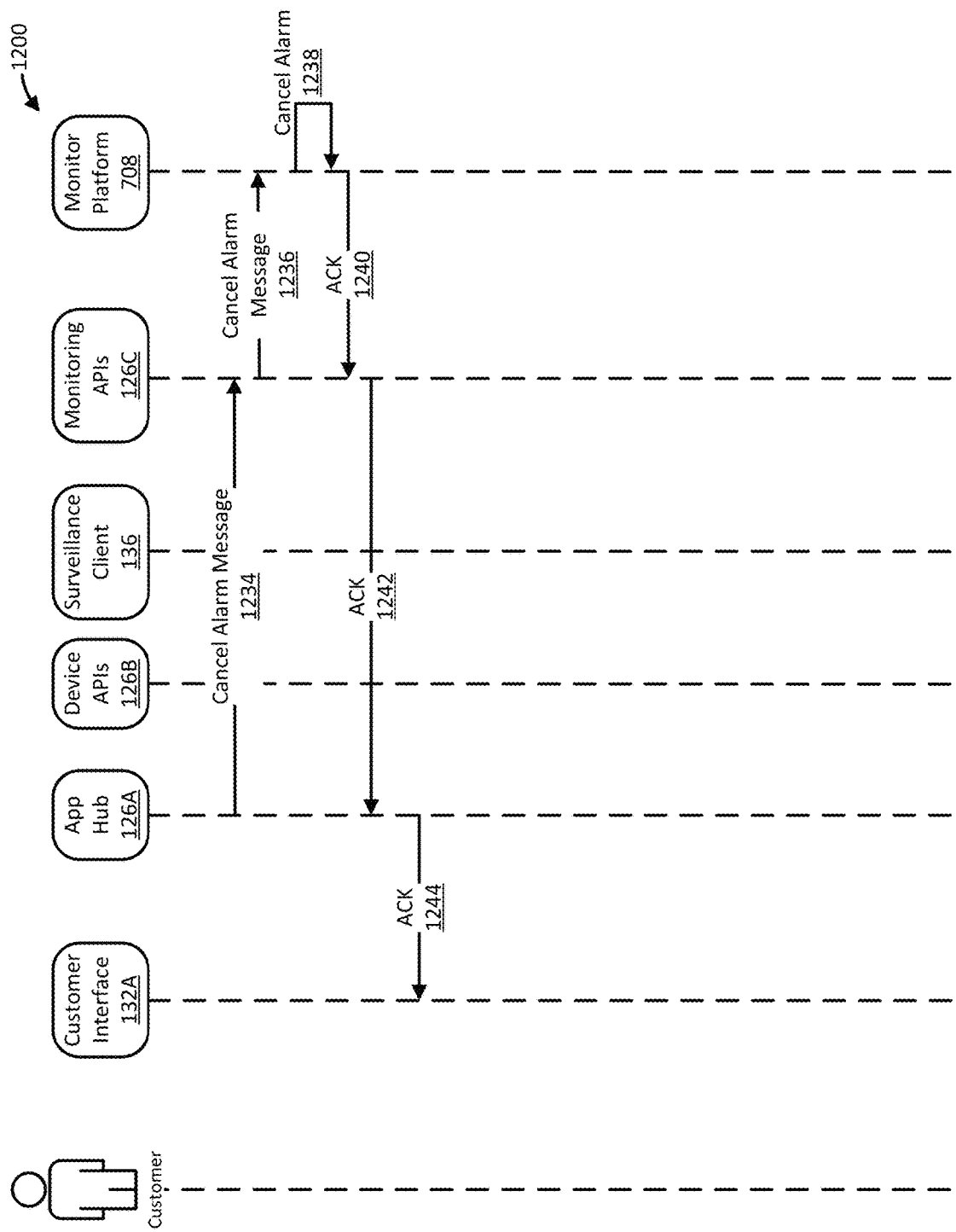

Turning now to FIGS. 12A and 12B, a cancel alarm process 1200 that is initiated in response to selection of a cancel alarm button (e.g., the cancel alarm button 902 of FIG. 9) is illustrated as a sequence diagram. The process 1200 can be executed, in some examples, by a security system (e.g., the security system 100 of FIG. 1). More specifically, in some examples, at least a portion of the process 1200 is executed by a data center environment (e.g., the data center environment 124 of FIG. 7) under control of a surveillance service (e.g., the surveillance service 128 of FIG. 7) or under control of transport services (e.g., the transport services 126 of FIG. 7). At least a portion of the process 1200 is executed by a customer device (e.g., the customer device 122 of FIG. 7) under control of a customer interface (e.g., the customer interface 132A of FIG. 7). At least a portion of the process 1200 is executed by a monitoring center environment (e.g., the monitoring center environment 120 of FIG. 7) under control of a monitor platform (e.g., the monitor platform 708 of FIG. 7). At least a portion of the process 1200 is executed by a base station (e.g., the base station 114 of FIG. 7) under control of a surveillance client (e.g., the surveillance client 136 of FIG. 1).

As shown in FIG. 12A, the process 1200 starts with the customer interface receiving 1202 input from a user that selects the cancel alarm button. For instance, in some examples, the customer interface is an app that displays a consolidated alarm screen (e.g., the consolidated alarm screen 900 of FIG. 9) including the cancel alarm button, and a customer taps the cancel alarm button after becoming convinced, from the information accessible via the consolidated alarm screen, that no help is needed and the alarm should be cancelled. In this example, the app receives a notification from an operating system of the customer device. This notification indicates the user tapped the cancel alarm button.

Continuing with the process 1200, the customer interface communicates a cancel alarm message 1204 to an app hub (e.g., the app hub 126A of FIG. 7). For instance, in some examples, the customer interface transmits the message 1204 to the app hub via a WebSocket connection previously established between the two processes. Alternatively, in some examples, the customer interface transmits the message 1204 as a REST POST request. The message 1204 may identify the alarm, the location, and/or the base station from which the alarm originated, among other information regarding the alarm.

Continuing with the process 1200, the app hub communicates a disarm message 1208 to at least one device API (e.g., one of the device APIs 126B of FIG. 7). For instance, in some examples, the app hub transmits the message 1208 to the device API via an inter-process communication. The message 1208 may identify the alarm, the location, and/or the base station from which the alarm originated, among other information regarding the alarm.

Continuing with the process 1200, the device API communicates a disarm message 1210 to a surveillance client (e.g., the surveillance client 136 of FIG. 1) that originated the alarm. For instance, in some examples, the device API transmits the message 1210 to the surveillance client via a WebSocket connection previously established between the two processes. The message 1210 may identify the alarm, the location, and/or the base station from which the alarm originated, among other information regarding the alarm.

Continuing with the process 1200, the surveillance client acknowledges 1212 receipt of the message 1210. For instance, in some examples, the surveillance client transmits an acknowledgement message to the device API via the WebSocket connection used to communicate the message 1210. The acknowledgement message may identify the cancel alarm message being acknowledged.

Continuing with the process 1200, the device API acknowledges 1214 receipt and delivery of the message 1208. For instance, in some examples, the device API transmits an acknowledgement message to the app hub via an inter-process communication. The acknowledgement message may identify the cancel alarm message being acknowledged.

Continuing with the process 1200, the app hub acknowledges 1216 receipt and delivery of the message 1204. For instance, in some examples, the app hub transmits an acknowledgement message to the customer interface via the WebSocket connection used to communicate the message 1204. Alternatively, in some examples, the app hub transmits the acknowledgement message as a REST API response. The acknowledgement message may identify the cancel alarm message being acknowledged.

In some examples, upon receipt of the acknowledgement message communicated in the operation 1216, the customer interface updates the consolidated alarm screen to indicate that the surveillance client has received the disarm message 1210. For instance, in some examples, the customer interface updates a chronology displayed in a chronology control group (e.g., the chronology control group 906 of FIG. 9) to include a reportable event detailing reception of the request to disarm the location-based devices.

Continuing with the process 1200, the surveillance client determines 1218 whether the surveillance client received the message 1210 before expiration of a configurable timeout period. For instance, in some examples, the surveillance client starts a timer upon the triggering of an alarm. In these examples, if the surveillance client receives a disarm message prior to expiration of the timer, the surveillance client determines that the timeout period was not exceeded and proceeds to cancel the alarm. Example durations of configurable timeout periods include 30 seconds, 60 seconds, 90 seconds, and 120 seconds to name a few.

Continuing with the process 1200, the surveillance client communicates a cancel alarm message 1220 to at least one device API. For instance, in some examples, the surveillance client transmits the message 1220 to the device API via a WebSocket connection previously established between the two processes. The message 1220 may identify the alarm, the location, and/or the base station from which the alarm originated, among other information regarding the alarm.

Continuing with the process 1200, the device API communicates a cancel alarm message 1222 to at least one monitoring API (e.g., one of the monitoring APIs 126C of FIG. 7) and at least one alarm event queue (e.g., one of the alarm event queues 704 of FIG. 7, not shown in FIG. 12A or 12B). For instance, in some examples, the device API transmits the message 1222 to the monitoring API via an inter-process communication and enqueues a Cancel_Alarm event in the alarm event queue. The message 1222 may identify the alarm, the location, and/or the base station from which the alarm originated, among other information regarding the alarm.

Continuing with the process 1200, the monitoring API communicates a cancel alarm message 1224 to a monitor platform (e.g., the monitor platform 708 of FIG. 7). For instance, in some examples, the monitoring API transmits the message 1224 to the monitor platform via a WebSocket connection previously established between the two processes. The message 1224 may identify the alarm, the location, and/or the base station from which the alarm originated, among other information regarding the alarm.

Continuing with the process 1200, the monitor platform cancels 1226 the alarm. For instance, in some examples, the monitor platform changes the status of the alarm to cancelled within an alarm queue maintained by the monitor platform. One or more monitor interfaces (e.g., the monitor interface 130A of FIG. 7) may, in response to the cancellation, change a representation of the alarm to indicate the cancellation within a GUI presented by the monitor interface, thereby notifying monitoring personnel that further handling of the alarm is not required.

Continuing with the process 1200, the monitor platform acknowledges 1228 receipt and processing of the message 1224. For instance, in some examples, the monitor platform transmits an acknowledgement message to the monitoring API via the WebSocket connection used to communicate the message 1224. The acknowledgement message may identify the cancel alarm message being acknowledged.

Continuing with the process 1200, the monitoring API acknowledges 1230 receipt and delivery of the message 1222. For instance, in some examples, the monitoring API transmits an acknowledgement message to the device API via an inter-process communication. The acknowledgement message may identify the cancel alarm message being acknowledged.

Continuing with the process 1200, the device API acknowledges 1232 receipt and delivery of the message 1220. For instance, in some examples the device API transmits an acknowledgement message to the surveillance client via the WebSocket connection used to communicate the message 1220. The acknowledgement message may identify the cancel alarm message being acknowledged.

Continuing with the process 1200 with reference to FIG. 12B, in some examples, to ensure that monitoring personnel are notified of the alarm cancellation regardless of time at which the cancel alarm button was pressed, the process 1200 continues with the app hub communicating a cancel alarm message 1234 to at least one of the monitoring APIs. For instance, in some examples, the app hub transmits the message 1234 to the monitoring API via an inter-process communication. The message 1234 may identify the alarm, the location, and/or the base station from which the alarm originated, among other information regarding the alarm.

Continuing with the process 1200, the monitoring API communicates a cancel alarm message 1236 to the monitor platform. For instance, in some examples, the monitoring API transmits the message 1236 to the monitor platform via a WebSocket connection previously established between the two processes. Alternatively, in some examples, the monitoring API transmits the message 1236 as a REST POST request. The message 1236 may identify the alarm, the location, and/or the base station from which the alarm originated, among other information regarding the alarm.

Continuing with the process 1200, the monitor platform cancels 1238 the alarm. For instance, in some examples, the monitor platform changes the status of the alarm to cancelled within an alarm queue maintained by the monitor platform. One or more monitor interfaces may, in response to the cancellation, change a representation of the alarm to indicate the cancellation within a GUI presented by the monitor interface, thereby notifying monitoring personnel that further handling of the alarm is not required.

Continuing with the process 1200, the monitor platform acknowledges 1240 receipt and delivery of the message 1236. For instance, in some examples, the monitor platform transmits an acknowledgement message to the monitoring API via the WebSocket connection used to communicate the message 1236. Alternatively, in some examples, the monitor platform transmits the acknowledgement message as a REST API response. The acknowledgement message may identify the cancel alarm message being acknowledged.

Continuing with the process 1200, the monitoring API acknowledges 1242 receipt and delivery of the message 1234. For instance, in some examples, the monitoring API transmits an acknowledgement message to the app hub via an inter-process communication. The acknowledgement message may identify the cancel alarm message being acknowledged.

Continuing with the process 1200, the app hub acknowledges 1244 receipt and delivery of the message 1204. For instance, in some examples, the app hub transmits an acknowledgement message to the customer interface via the WebSocket connection used to communicate the message 1204. The acknowledgement message may identify the cancel alarm message being acknowledged. After completion of the operation 1244, the process 1200 may end.

In some examples, upon receipt of the acknowledgement message communicated in the operation 1244, the customer interface updates the consolidated alarm screen to indicate that selection of the cancel alarm button has been processed. For instance, in some examples, the customer interface updates a chronology displayed in a chronology control group (e.g., the chronology control group 906 of FIG. 9) to include a reportable event detailing cancellation of the alarm.

It should be noted that, in some examples, the app hub communicates the message 1208 and the message 1234 concurrently, so as to ensure that monitoring personnel are notified as quickly as possible of the user's selection of the cancel button. It should also be noted that, in some examples, the app hub communicates both of the messages 1208 and 1234 in response to receipt of the message 1204.

Figure 13:
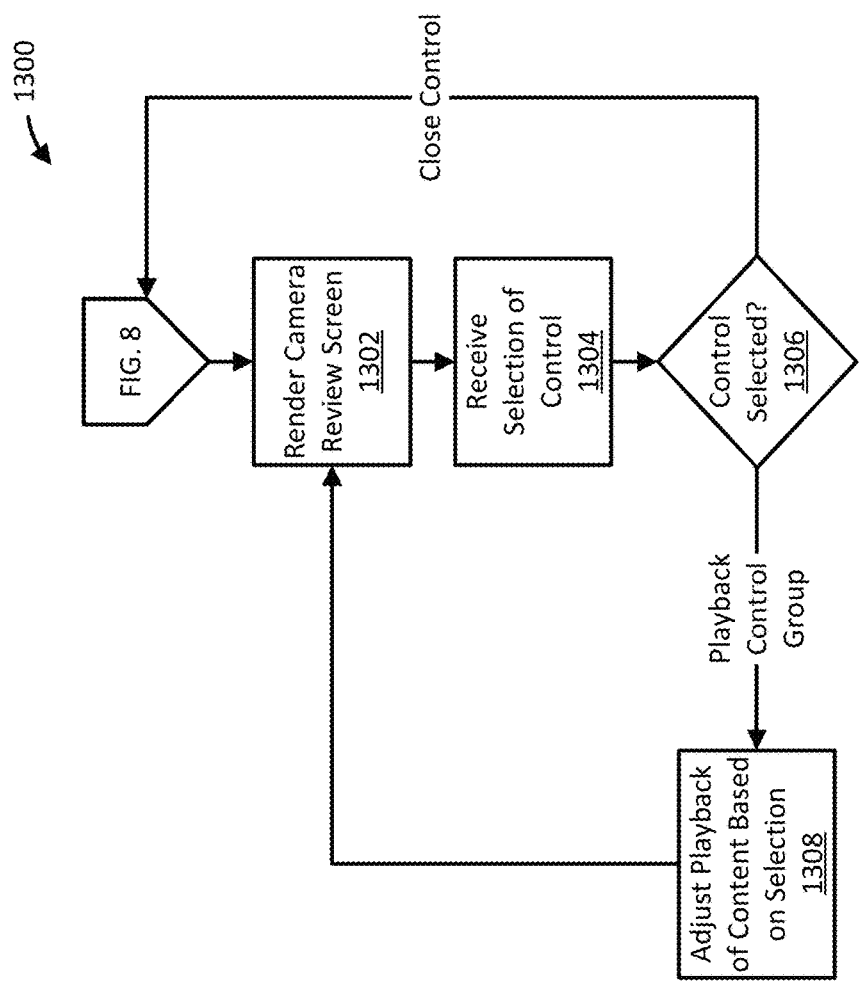
FIG. 13 is a flow diagram illustrating a provisioning process for a user interface screen to display content from a camera, according to some examples described herein.

Turning now to FIG. 13, a camera screen provisioning process 1300 that is initiated in response to selection of a recordings control (e.g., the recordings control 912 of FIG. 9) is illustrated as a sequence diagram. The process 1300 can be executed, in some examples, by a security system (e.g., the security system 100 of FIG. 1). More specifically, in some examples, at least a portion of the process 1300 is executed by a customer device (e.g., the customer device 122 of FIG. 7) under control of a customer interface (e.g., customer interface 132A of FIG. 7).

As shown in FIG. 13, the process 1300 starts with the customer interface, which may be a smartphone app, rendering 1302 a camera review screen via, for example, a touchscreen. FIG. 14 illustrates one example of a camera review screen 1400 that can be rendered in some examples. As shown in FIG. 14, the camera review screen 1400 includes a display area 1406, a close button 1404, and a playback control group 1422. Through the camera review screen 1400 and the controls included therein, the customer interface enables the user to view images captured by a specific camera. The user may select the close button 1404 to navigate to the consolidated alarm screen.

Returning to the process 1300, the customer interface receives 1304 input selecting a control of the screen 1400. For instance, in some examples, the customer interface receives the input selecting the control by executing the processing described above with reference to the operation 804 of FIG. 8.

Continuing with the process 1300, the customer interface determines 1306 which control of the screen 1400 is selected. For instance, in some examples, the customer interface identifies the control and the type of selection by executing the processing described above with reference to the operation 806 of FIG. 8.

Continuing with the process 1300, if the customer interface determines that the close button 1404 is selected, the customer interface returns to the previously executing process. If the customer interface determines that a control of the playback control group 1422 is selected, the customer interface adjusts 1308 playback of the camera content, within the display area 1406, in accordance with the selected control. Adjusting 1308 may include toggling between pause and play, adjusting volume, moving to a different location within the content, etc.

Figure 15:
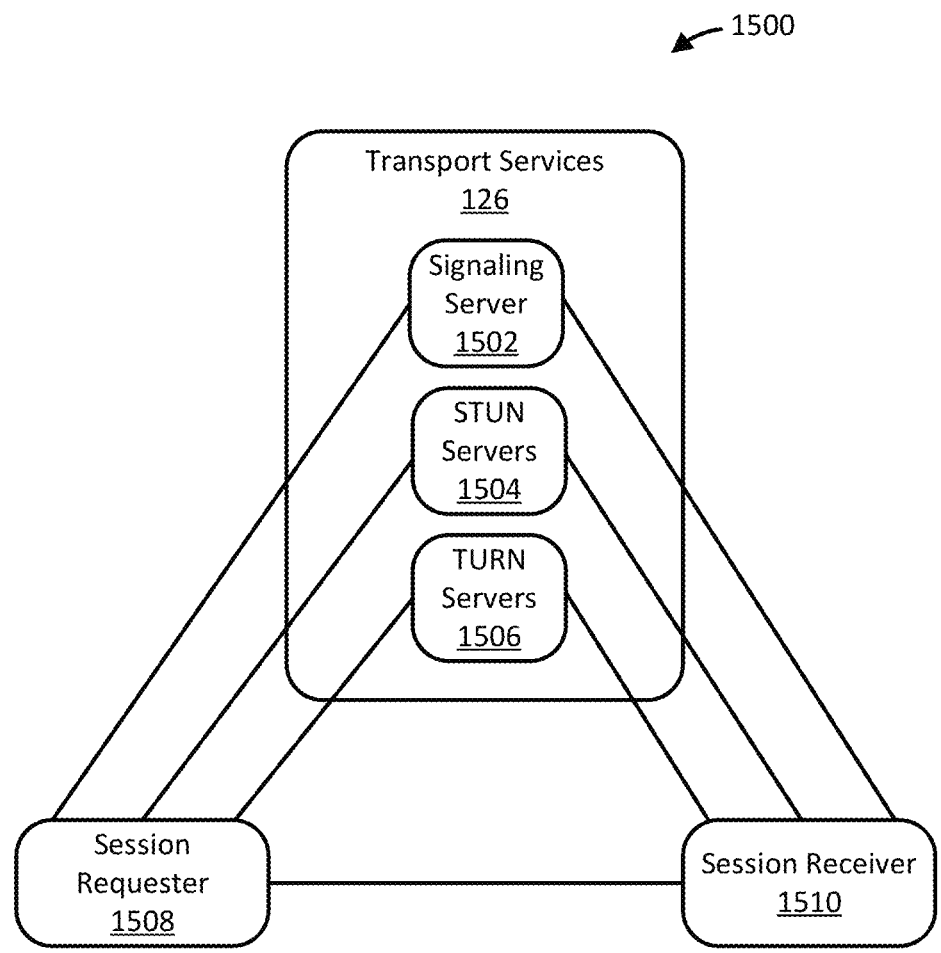
FIG. 15 is a schematic diagram of processes involved in establishing and conducting real time communication sessions, according to some examples disclosed herein.

Turning now to FIG. 15, a set of processes 1500 involved in establishing and conducting a communication session (e.g., a real time communication session) in response to selection of a go live control group 908 member (e.g., the front door button 914 or the living room button 916) of FIG.

9 is illustrated as a schematic diagram. As shown in FIG. 15, the set of processes 1500 includes the transport services 126, which are described above with reference to FIG. 7. As is further shown in FIG. 15, the transport services 126 include a signaling server 1502, one or more Session Traversal Utilities for Network Address Translators (STUN) servers 1504, and one or more Traversal Using Relays around Network Address Translators (TURN) servers 1506. The set of processes 1500 further includes a session requester 1508 and a session receiver 1510. The requester 1508 may be the monitor interface 130A or the customer interface 132A described above with reference to FIG. 7. The receiver 1510 may be the surveillance client 136 or a DCS (e.g., the camera agent 138 or another DCS) as described above with reference to FIG. 7.

In some examples, the requester 1508 is configured to communicate with the receiver 1510 via the signaling server 1502 to establish a real time communication session via, for example, a web real time communication (WebRTC) framework. The signaling server 1502 is configured to act as an intermediary or broker between the requester 1508 and the receiver 1510 while a communication session is established. As such, in some examples, an address (e.g., an IP address and port) of the signaling server 1502 is accessible to both the requester 1508 and the receiver 1510. For instance, the IP address and port number of the signaling server 1502 may be stored as configuration data in memory local to the devices hosting the requester 1508 and the receiver 1510. In some examples, the receiver 1510 is configured to retrieve the address of the signaling server 1502 and to register with the signaling server 1502 during initialization to notify the signaling server of its availability for real time communication sessions. In these examples, the requester 1508 is configured to retrieve the address of the signaling server 1502 and to connect with the signaling server 1502 to initiate communication with the receiver 1510 as part of establishing a communication session with the receiver 1510. In this way, the signaling server 1502 provides a central point of contact for a host of requesters including the requester 1508 and a central point of administration of a host of receivers including the receiver 1510.

Continuing with the example of FIG. 15, the STUN servers 1504 receive, process, and respond to requests from other devices seeking their own public IP addresses. In some examples, individual requesters 1508 and the receiver 1510 are configured to interoperate with the STUN servers 1504 to determine the public IP address of its host device. The TURN servers 1506 receive, process, and forward WebRTC messages from one device to another. In some examples, individual requesters 1508 and the receiver 1510 are configured to interoperate with the TURN servers 1506, if a WebRTC session that utilizes the public IP addresses of the host devices cannot be established (e.g., a network translation device, such as a firewall, is interposed between the host devices).

In some examples, a requester 1508 exchanges interactive connectivity establishment (ICE) messages with the STUN servers 1504 and/or the TURN servers 1506. Via this exchange of the messages, the requester 1508 generates one or more ICE candidates and includes the one or more ICE candidates within a message specifying an SDP offer. Next, the requester 1508 transmits the message to the signaling server 1502, and the signaling server 1502 transmits the message to the receiver 1510. The receiver 1510 exchanges ICE messages with the STUN servers 1504 and/or the TURN servers 1506, generates one or more ICE candidates and includes the one or more ICE candidates within a response specifying an SDP answer. Next, the receiver 1510 transmits the response to the signaling server 1502, and the signaling server 1502 transmits the response to the requester 1508. Via the messages, the requester 1508 and the receiver 1510 negotiate communication parameters for a real time communication session and open the real time communication session.

In some examples, while participating in the real time communication session, the receiver 1510 (e.g., the image capture device 110 of FIG. 7) collects audio-visual sensor data (e.g., through a camera and microphone of the image capture device 110) and transmits the audio-visual sensor data to the requester 1508. Further, in these examples, while participating in the real time communication session, the receiver 1510 outputs audio (e.g., via a speaker within the image capture device 110) received from the requester 1508. In a similar fashion, while participating in the real time communication session, the requester 1508 renders (e.g., via a display and speaker in the customer device 122 of FIG. 7) the audio-visual sensor data collected by the receiver 1510. Further, while participating in the real time communication session, the requestor 1508 collects audio data (e.g., through a microphone of the customer device 122) and transmits the audio data to the receiver 1510. In this way, a customer or monitoring agent can interact with an individual at a location in real time to help dispose of the alarm.

Customers often view alarms as something more than a collection of signals produced by alarm system components that change the state of the alarm system as a whole. In particular, customers typically understand alarms as an aggregation of signals related to an intrusion or other event at a location, in addition to the activities involved in responding to or otherwise handling the alarm.

As used herein, the term "alarm" refers to the real-world experience of a customer having their alarm system, installed at a monitored location, detect an issue (such as an intrusion, an environmental issue, a reported medical emergency, or a "panic" signal received when a customer actuates a panic button), annunciate the issue through the triggering of an alarm state for the alarm system (for example, by triggering one or more sirens), and report the alarm details to a monitoring platform for handling. An "alarm" may also include subsequent activities of the monitoring center, customer contacts, dispatchers, and emergency services personnel.

As disclosed herein, the triggering and subsequent handling of an alarm may involve actions taken by various alarm system components and people (also referred to herein as "actors") interacting with such components. Examples of such actors include the customer of the alarm service, contacts of the customer, monitoring personnel associated with a monitoring center environment, dispatchers, emergency services personnel who are dispatched to a monitored location, and even an intruder observed at the monitored location.

Signals generated by alarm system components can be routed to monitoring center environment 120 using, for example, monitoring APIs 126C. In some cases the alarm signals may be delivered to multiple distinct monitoring center environments. Monitoring and other alarm handling activities, such as dispatch of emergency services, can be handled by monitoring personnel associated with the monitoring center environment and/or other personnel downstream of the monitoring center environment (for example, dispatchers at a dispatch center). In certain implementations, and as disclosed in greater detail herein, actions taken by monitoring personnel and/or other downstream personnel can be reported back to data center environment 124. This provides transparency to the surveillance service 128, and in turn to customers, with respect to the handling of alarms, as defined above.

Certain of the techniques disclosed herein provide the customer with more robust information on what activities were performed in the course of handling an alarm. More specifically, certain techniques disclosed herein can aggregate alarm signals and base station status changes with monitoring and dispatch events to provide customers with detailed information about an alarm incident. Disclosed herein is logic that aggregates alarm events into alarm incidents, and that generates summary state information from the alarm events.

As used herein, the term "alarm event" refers to an activity associated with the triggering and handling of an alarm at a monitored location. In certain implementations alarm events are uniquely identified with an event identifier, have a timestamp, and identity the monitored location associated with the alarm event. An alarm event optionally includes additional details specific to the type of alarm event and the source of the alarm event. Tables 1 and 2, above, list examples of reportable events which may be considered "alarm events".

As used herein, the term "alarm incident" refers to an aggregation of alarm events intended to represent an alarm. An alarm incident includes the collection of one or more alarm events and summary data derived from the collection of alarm events. In certain implementations alarm incidents are uniquely identified with an incident identifier, will be associated with an identifier of the monitored location, and/or will have a timestamp that is generated by identifying the timestamp of the alarm event that triggered the alarm.

In certain implementations an alarm history service aggregates alarm events into an alarm incident and calculates a summary state for the alarm incident. In particular, the alarm history service can host an alarm lifecycle calculator that aggregates alarm events into alarm incidents. The aggregated events and state information can be presented to a customer via, for example, a consolidated alarm user interface.

Figure 17:
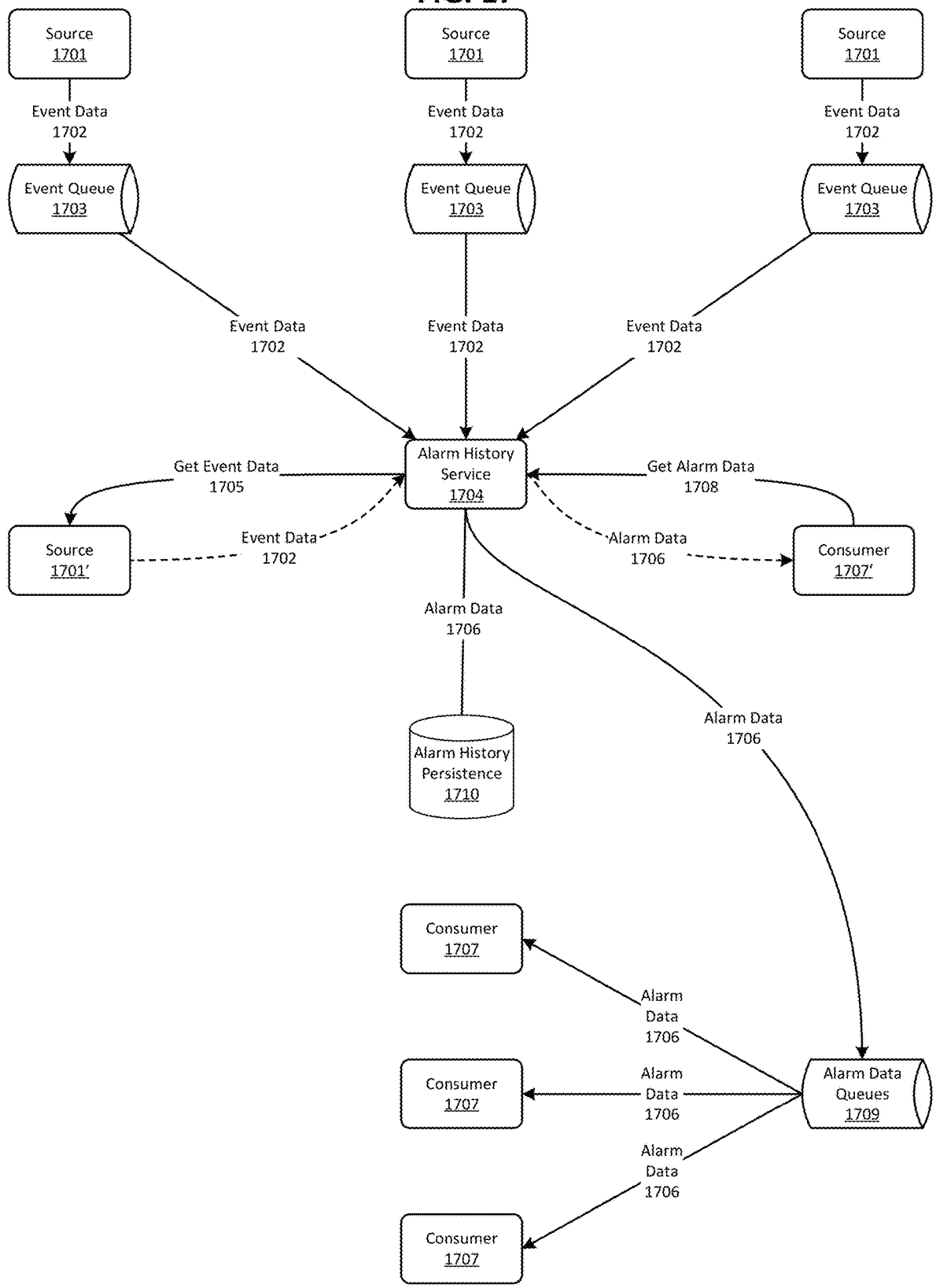
FIG. 17 is a schematic diagram illustrating data flows to and from an alarm history service according to some examples described herein.

To this end, FIG. 17 provides a schematic diagram illustrating data flows to and from an alarm history service 1704 according to some examples described herein. In particular, FIG. 17 illustrates a plurality of sources 1701 (for example, alarm event sources which may include, but are not limited to, an image capture device, a contact sensor assembly, a keypad, a motion sensor assembly, a monitoring specialist, and a base station) that generate event data 1702. Event data 1702 is representative of, or otherwise characterizes, an event detected by one or more of sources 1701. A source can be understood as a device or platform that links one of the aforementioned "actors" to the alarm platform. Event data 1702 is passed to a service, for example, alarm history service 1704. In one implementation, service 1704 subscribes to event data 1702 generated by sources 1701, for example using a data distribution platform such as MQTT or Apache Kafka, and receives push notifications based on such subscription. This may be understood as an asynchronous approach to delivery of event data 1702. FIG. 17 illustrates an example wherein the data distribution platform is implemented using one or more event queues 1703.

In some cases alarm history service 1704 can retrieve event data 1702 by sending a request to a particular source 1701'. Such request is represented in FIG. 17 by a get event data request 1705 extending from alarm history service 1704 to source 1701'. More specifically, this represents alarm history service 1704 sending get event data request 1705 to source 1701' for event data 1702. Source 1701' may respond to such request by sending event data 1702 to alarm history service 1704.

FIG. 17 also illustrates production, by alarm history service 1704, of messages that include event data 1702 that has been transformed into processed and aggregated alarm data 1706, which can in turn be provided to notify one or more consumers 1707. Depending on the particular implementation, in this context a "consumer" may include one or more of a user of customer device 122, personnel associated with or downstream of monitoring center environment 120, and/or personnel associated with data center environment 124. As used herein, the term "alarm data" includes aggregated data generated by alarm history service 1704 to represent data related to alarms, including individual alarm events and aggregated alarm incident data.

A consumer can be understood as being able to retrieve alarm data 1706 through at least two pathways. First, a particular consumer 1707' can send a query to a public application programming interface (API) and retrieve data for a specified monitored location. Such request may be referred to as a synchronous request. This is represented in FIG. 17 by a get alarm data request 1708 extending from consumer 1707' to alarm history service 1704. Request 1708 may specify, for example, a specific location and/or a specific timeframe. In some implementations request 1708 may specify a particular resource, such as a certain alarm incident identifier or the latest alarm for a specified monitored location. Such a synchronous request 1708 may be useful in implementations wherein a consolidated alarm user interface is initially launched or initially populated with data acquired proactively from alarm history service 1704. In some cases, once the user interface is initially populated with relevant data, updates may be acquired via an asynchronous subscription.

Additionally or alternatively, one or more consumers 1707 may subscribe to alarm data 1706 generated by alarm history service 1704 using a data distribution platform such as MQTT or Apache Kafka. Examples of such a data distribution platform are illustrated schematically in FIG. 17 as an alarm data queue 1709. In this case, the one or more consumers receive push notifications based on such subscription. This may be understood as an asynchronous approach to delivery of alarm data 1706 to one or more consumers 1707. In general, in a given implementation there may be several alarm data queues, such as an alarm event data queue, an alarm queue, a latest alarms queue, and an active alarms queue.

Quality Assurance ("QA") tools can also use synchronous requests to obtain information from the service (for example, alarm history service 1704). For example, in certain applications a QA tool is used to review what actions monitoring personnel may have taken in response to particular alarm events or alarm incidents. For example, a supervisor (for example, a monitoring environment supervisor) can synchronously request alarm data characterizing a specific alarm incident and/or a alarm data associated with individual alarm incidents, thus providing insight into how the alarm incidents have been handled.

In an example implementation, certain sources (for example, certain alarm event sources 1701) may not publish events, or alarm history service 1704 may not be configured to subscribe to events generated by particular sources. In this case, triggers associated with certain lifecycle events can be configured to cause service 1704 to synchronously request data (for example, event data 1702). For example, in certain applications a video quality record is generated. In particular, certain detected events may trigger an image capture device to begin recording video. Monitoring center personnel may review the recorded video and may wish to understand the video quality provided by a given image capture device. In this case, once the alarm is triggered, a synchronous request can be transmitted to one or more image capture devices (or one or more entities responsible for persisting data captured by one or more image capture devices) to obtain video quality information.

In principle, the service (for example, alarm history service 1704) can subscribe to any generator of alarm signals, also referred to herein as a "source", with the resulting effect that when a signal indicative of an alarm is delivered to the monitoring center environment, a record of such delivery is created. This also allows predictions to be made with respect to how the monitoring center environment will handle the alarm event. For example, the monitoring center environment might generate a new alarm incident, or might aggregate the incoming alarm event into an existing alarm incident. In certain applications, the received alarm event may result in priority escalation of an existing alarm incident. In some implementations the response from the monitoring center environment depends at least in part on a type of monitoring mode that is invoked for the monitored location (for example, monitored, monitored with no dispatch, or not monitored).

In some implementations it may be useful to make predictions about how the monitoring center environment may respond to an alarm event. There is a delay when an alarm signal is delivered to and handled by the monitoring center environment. During this delay it is advantageous to provide a consumer with an accurate status of the alarm handling. A prediction allows status to be updated and new alarm incidents to be created without waiting for a response from the monitoring center environment. Even where an erroneous prediction is made, for example where a subsequent acknowledgement indicates that the monitoring center environment will handle a particular alarm event (in a way contrary to an initial prediction), the alarm state can subsequently be updated accordingly.

Multiple subscription topics, schematically represented by alarm data queues 1709, can be relevant for a given alarm incident. Examples include a subscription topic that identifies all alarm incidents regardless of location, a subscription topic that identifies an active alarm for particular location (or, if there are no active alarms, this subscription topic would return a null value), or a subscription topic that identifies a most recent alarm for a particular location (such that when an active alarm is cleared, the most recent alarm is left in a same state until another active alarm occurs).

In general, a subscription (for example, a consumer alarm event subscription) can be used as a conduit to an alarm analytics platform.

Figure 18:
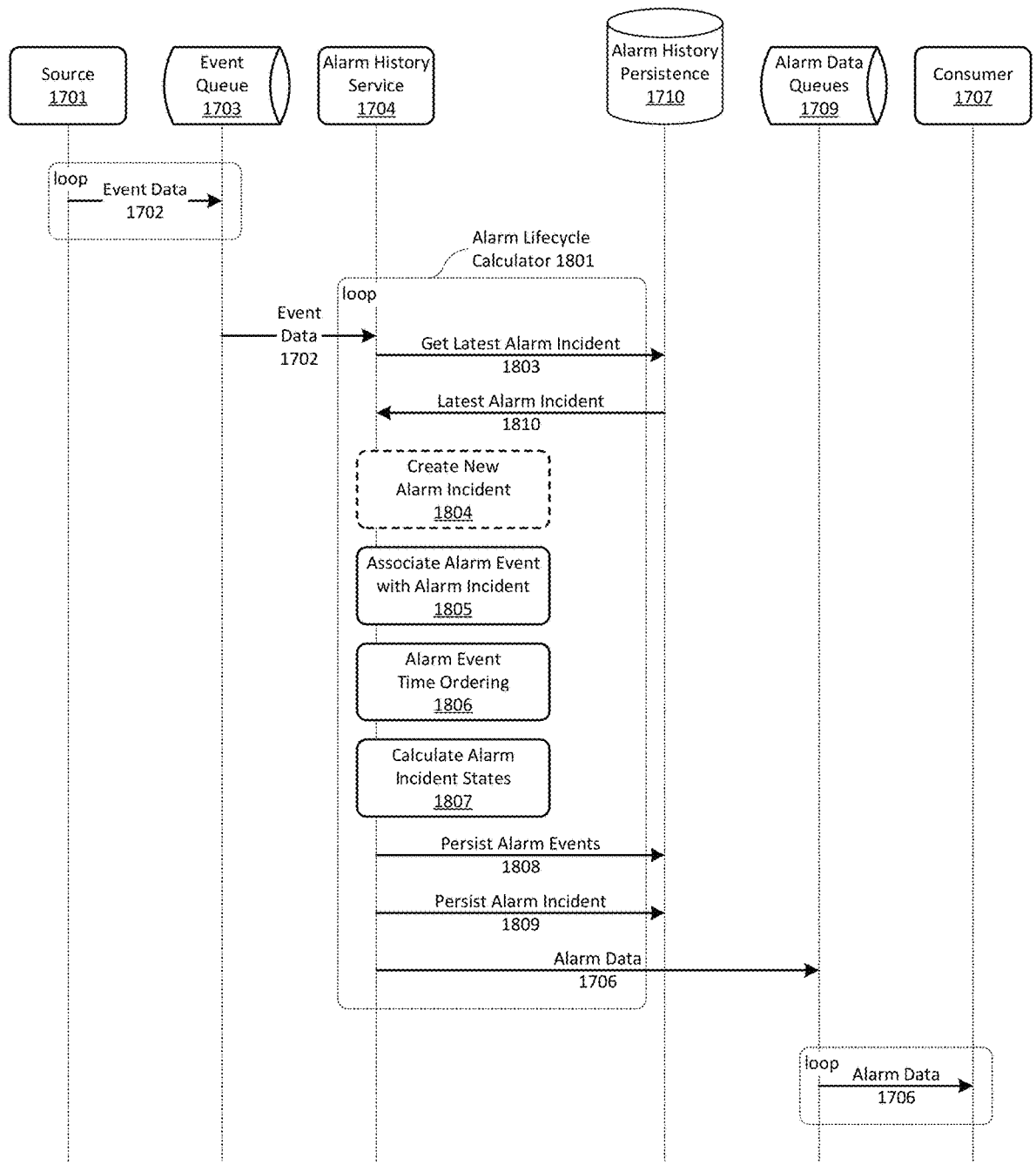
FIG. 18 is a sequence diagram illustrating operations performed by an alarm lifecycle calculator, according to some examples described herein.

FIG. 18 is a sequence diagram illustrating operations performed by an alarm lifecycle calculator 1801, according to some examples described herein. More specifically, FIG. 18 schematically illustrates the handling of incoming alarm events; the aggregation of those alarm events into an alarm incident; the calculation of an updated alarm incident state; and the publication of the alarm incident and the updated alarm incident state to a consumer or other person of interest. In general, a wide range of event sources 1701 will individually publish messages to a corresponding queue, for example, event queue 1703, corresponding to that source of an event (see also, for example, event queue(s) 704 described above with reference to FIG. 7). Alarm history service 1704 can subscribe to these queues 1703 and can then handle messages from individual sources (for example, alarm event sources) with source- and message-specific logic. In general, event data 1702 can be delivered to alarm history service 1704 asynchronously using event queue 1703. In particular, while event data 1702 is published to event queue 1703 synchronously and is consumed from event queue 1703 synchronously, such publication and consumption are not coupled, and therefore the delivery of event data 1702 from source 1701 to alarm history service 1704 is asynchronous. However, as noted above, in alternative implementations alarm events can be retrieved synchronously. For example, video recording quality data can be retrieved and converted into an alarm event where the alarm event being processed represents the creation of a new contemporary alarm incident.

Referring still to FIG. 18, consumer 1707 refers to an entity that wishes to consume alarm event and/or alarm incident messages generated by alarm history service 1704. As noted above, and depending on the particular implementation, in this context an alarm consumer may include one or more of a user of customer device 122, personnel associated with or downstream of monitoring center environment 120, and/or personnel associated with data center environment 124. In one implementation, event data 1702 are published to a message topic when created or updated, while alarm data 1706 are published when alarm events are processed and associated with an alarm incident.

As illustrated in FIG. 18, event queue 1703 receives event data 1702 characterizing one or more events indicative of an alarm condition. In general, the event data 1702 may be delivered to alarm history service 1704 out of chronological order, but will be reordered and processed by the service as a time ordered stream of events. FIG. 18 schematically illustrates an alarm event to alarm incident association logic where the latest alarm incident represents the only potential existing alarm incident for the incoming alarm event. This logic represents a significant portion of alarm event handling scenarios because alarm events are often processed as they are generated. However, as alluded to above, it is possible that an older alarm event may be received out of chronological order, in which case additional logic will be used to determine the appropriate alarm incident with which to associate the alarm event, as will be described in turn.

FIG. 18 illustrates a process associated with the alarm lifecycle calculator 1801 that is used to aggregate alarm events into an alarm incident and to calculate an "alarm incident state" associated with the alarm incident. In certain implementations, this is accomplished by subscribing to message topics that publish alarm events to alarm history service 1704, grouping these alarm events by a unique location identifier, aggregating these events with existing events for that location identifier, ordering the alarm events by time (for example, event timestamp), associating groups of alarm events into alarm incidents, and calculating summary state information (also referred to as "alarm incident state") for the alarm incident. The relationship of the alarm events to alarm incidents can be persisted with an alarm incident summary state. For example, in an implementation wherein an RDBMS store is used to persist this relationship, a join table with an alarm event identifier and alarm incident identifier keys could be used. The alarm events can be persisted with the alarm incident identifier. While alarm lifecycle calculator 1801 is capable of appending new alarm events to existing alarm incidents, it can also inject historic alarm events as well (that is, alarm events that occurred before the most recent alarm incident). As used in this context, references to information being "persisted with" an object refers to the information being stored in a persistent layer of a data structure.

In general, alarm incident states are derived from the collection of alarm events which have been aggregated into a corresponding alarm incident at a given time, although these states are ephemeral and can change as new alarm events are received. This behavior represents an appreciation that knowledge of a given alarm incident may be imperfect at any given time. Alarm lifecycle calculator 1801 receives an incoming stream of alarm events which are ordered based on timestamp. The calculator evaluates the alarm events and determines whether each incoming alarm event should be added to a new alarm incident or should be aggregated into an existing alarm incident.

In certain implementations, an incoming alarm event will have at least two properties that are used to determine how a chronological collection of alarm events are aggregated into alarm incidents. A first property is a unique identifier (such as a service identifier) that represents the monitored location where the alarm event originated or that allows such monitored location to be determined. A second property is a timestamp (for example, a UTC timestamp or any other timestamp defined with respect to a fixed reference (such as any specified time zone), thereby allowing timestamps to be compared to each other) that can be used to generate the chronological collection of alarm events. If an incoming alarm event does not include its own timestamp, a timestamp can be generated upon receipt. The specific type of the data used to represent these properties (for example string, integer, hash, or GUID) is not relevant to the solution, provided that the identifier adequately identifies the relevant location or timestamp.

An alarm event may have additional properties. For example, an alarm event may be characterized by a "type" that indicates the source of the alarm event, the nature of the alarm event, and the shape of the event data. In some implementations an alarm event may include an "Alarm Signal" dataset, which includes data characterizing the sensor, with properties identifying the sensor such as the sensor name, type, and unique identifier, and the signal generated by the sensor (with properties uniquely identifying the signal code, for example, the contact identifier and zone). Such data can be acquired from the data center environment (for example, "an alarm event generated by the back door glass break sensor") when an event documenting receipt of alarm signals is received from the monitoring center environment (for example, "an alarm event generated by receipt of the back door glass break signal by the monitoring center environment (a burglary signal was received and will be handled accordingly)").

Another example alarm event defines activities involved in handling the alarm event in the monitoring center environment, for example, as those documented in Table 2 above. Each such event code may have additional data. For example, the additional data may include an "assigned" parameter, which indicates that the alarm event has been dequeued and assigned to personnel associated with the monitoring center environment. The additional data may contain an identifier of the personnel associated with the monitoring center environment who is assigned to handle the alarm.

Another example alarm event indicates that monitoring center environment personnel are initiating a call. Such event may include the call recipient, the type, and the phone number. Such data could provide insight such as an indication that the monitoring center personnel is attempting to call a customer contact, and could be used to subsequently update a customer state to include a contact with the state of "Contacting". Alternatively, such data could provide insight such as an indication that the monitoring center personnel is attempting to call an emergency services dispatcher, in which case the agency type (for example, police, fire, medical) and phone number could be indicated. This might trigger a new dispatch to be added to a dispatch state, with the appropriate agency type and the state of "Contacting".

Another example alarm event indicates the disposition of a call. Such event may include data indicating which call was completed and the outcome of the call (for example, "left message"). In some implementations the call disposition could be matched with a set of active calls that have been recorded and the call in question could be updated (or a new call may be generated and the disposition recorded). The call disposition could be used to update the customer contact or dispatch request, which in turn would update the summary state based on the outcome and the other customer contacts and/or dispatches associated with the alarm incident. The outcome could be, for example, an invalid phone number, a request for dispatch, or a request to cancel. The monitoring center environment may or may not honor these requests based on an established event handling protocol. As disclosed herein, advance predictions may be made with respect to an expected action by the monitoring center environment.

Referring still to FIG. 18, when event data 1702 corresponding to an event indicative of an alarm condition is received by alarm history service 1704, the latest alarm incident for the monitored location associated with the alarm event is retrieved from an alarm history persistence resource 1710. See reference numerals 1803 and 1810 in FIG. 18. Optionally, if no such alarm incident exists, a new alarm incident with only the new alarm event is created. See reference numeral 1804 in FIG. 18. The latest alarm incident retrieval can be accomplished using various techniques depending on the type of persistence layer in which alarm event records are stored. For example, in one implementation records are stored in an Amazon DynamoDB database with a partition key that includes the location identifier and a sort key that includes the event timestamp in a ISO 8601 format that produces a linearly sortable value. In such implementations, the first record for the identified location is retrieved when the records are ordered by the sort key in reverse and the first record is then returned. Once the latest incident is identified, or once a new incident is created, the event is associated with the incident. See reference numeral 1805 in FIG. 18.

In certain implementations, when a new alarm incident is created, it is possible to identify certain system events occurring within a certain "pre-roll" period that precedes the alarm event that triggered creation of the new alarm incident. In one example implementation, the pre-roll period is about 5 min, although shorter (for example, 1 min, 2 min, 3 min, or 4 min) or longer (for example, 6 min, 7 min, 8 min, 9 min, or 10 min) periods may be used in alternative implementations. The duration of the pre-roll period may be set as a fixed default, or may be based on user input. The identified events in the pre-roll period can be incorporated into the alarm incident. These events are identified and incorporated into the alarm incident because, in many cases, information about what happened in the moments leading up to the start of the alarm can be valuable in determining whether the alarm is real or false.

For example, an electronic cancellation signal followed shortly thereafter by a panic signal might normally be separated into distinct alarm incidents. In particular, delineation of alarm incidents may be determined by both the alarm signals and a time component, where the time component works in at least two ways. First, signals that are significantly separated in time generally should be broken into distinct alarm incidents, as that represents the real-world experience. Second, alarms that would ordinarily be considered distinct might be aggregated if they occur close in time.

Additionally or alternatively, alarm signals may be aggregated into a single alarm incident through analysis of events occurring in a pre-roll period. In some embodiments a de-duplication process is invoked on alarm events identified in the pre-roll period to avoid processing a same event multiple times. The de-duplication process can be used, for example, to enforce a rule that each alarm event can be associated with only one alarm incident.

In certain implementations, events that are associated with a particular incident can be ordered based on a timestamp. See reference numeral 1806 in FIG. 18. For example, if, in response to receiving the alarm event, it is determined that the incoming alarm event postdates the most recent alarm incident (that is, the timestamp of the incoming alarm event is greater than or equal to the timestamp of the earliest alarm event already assigned to the most recent alarm incident), the new alarm event is added to the events associated with the most recent alarm incident. The alarm incident state is then calculated using the aggregated set of events (including the incoming alarm event). See reference numeral 1807 in FIG. 18. In some applications this calculation may yield an update to the latest alarm incident or may yield multiple alarm incidents depending on whether the new event represents a new alarm incident. That is, the set of alarm events may be reallocated into a new set of alarm incidents, possibly with one or more previously-received alarm events being reallocated into a different alarm incident.

In some cases a time threshold is optionally used to separate alarm events into distinct alarm incidents.

If, in response to receiving the alarm event, it is determined that the incoming alarm event predates the most recent alarm incident, then all alarm incidents for the monitored location are retrieved and the two sequential alarm incidents that immediately precede and follow the alarm event are identified, if they exist. The incoming alarm event is aggregated with all the alarm events for those two adjacent alarm incidents, and the alarm incident states are recalculated based on the aggregated set of alarm events. In some applications this recalculation may yield an update to one or both of the existing alarm incidents, while in other applications this recalculation may yield a new alarm incident. The particular result in a given application will, in general, depend on the nature of the incoming alarm event and the existing chronological listing of previously received alarm events.

In some implementations alarm signals may be aggregated such that concurrent alarm events can be allocated to separate alarm incidents. This can be accomplished by decomposing alarm signals into specified alarm signal classifications. Example classifications may include security threats (such as a glass break signal or motion detection signal) and environmental threats (such as a moisture detection signal or a freeze detection signal). Where such classifications are used, incoming alarm signals may be grouped first by location and then by classification. This framework facilitates monitoring of a single location that experiences multiple discrete events simultaneously, and helps both monitoring personnel and customers to deliberately ignore events associated with a less critical alarm incident (for example, a water leak) if there is a more critical alarm incident (for example, an intruder) occurring simultaneously.

Referring still to FIG. 18, once the alarm events are allocated into one or more alarm incidents, and the corresponding alarm incident state is calculated, the resulting state information can be persisted such that it is available to an alarm consumer that requests a state of the alarm incident. For example, alarm data 1706 that represents an alarm event and/or an alarm incident can be persisted in alarm history persistence resource 1710. See reference numerals 1808 and 1809 in FIG. 18. In certain applications, alarm data 1706 can also be published on one or more alarm event queues 1709 from which consumer 1707 can retrieve event and/or incident information based on a subscription. Consumer 1707 can use a public API associated with alarm history service 1704 to acquire such data (see, for example, get alarm data request 1708 in FIG. 17), or via a subscription to a published message queue.

In some cases, if it is determined that an alarm incident state has been calculated with outdated logic or incomplete data, alarm lifecycle calculator 1801 can be configured to request all event data 1702 for the location of interest and recalculate the alarm incidents and their associated alarm incident state. The calculation can likewise be reperformed in response to receiving historical event data 1702.

In certain implementations alarm lifecycle calculator 1801 incorporates multiple components in alarm history service 1704. An alarm state calculator component takes a collection of alarm events and generates a collection of alarm incident states. An alarm service component determines whether existing alarm incidents are stale and, based on this determination, compiles existing alarm events for a location, combines them with any new alarm events, and passes the resulting collection of events through the calculator. The alarm history service also converts calculated alarm incident states into actual alarm incidents, and includes logic to either update existing alarm incidents or create new alarm incidents.

The alarm incident state properties and the logic to derive this state may change over time. In some implementations, the alarm state calculator component is versioned, and the persisted data in alarm history persistence resource 1710 includes the version of the alarm state calculator component used to calculate the state. In some instances, alarm history service 1704 can determine, either at the time of handling new alarm events or upon retrieval of event data 1702 by clients, whether event data 1702 was generated with a stale version of the alarm state calculator component. In such an event, alarm history service 1704 will retrieve alarm events associated with the alarm incident's location (including any new events being processed) and recalculate them using the current alarm state calculator component, saving the updates to both the alarm incidents and alarm events.

In addition, in certain implementations the process illustrated in FIG. 18 can be executed concurrently for different monitored locations, with alarm events for a particular location being processed either sequentially in chronological order or as a batch. In other implementations calculations for a particular monitored location can be held until intervening calculations for a different monitored location are performed. In general, if incoming alarm events are processed in real-time, a corresponding collection of alarm incidents will be generated by alarm lifecycle calculator 1801 in real-time.

As noted above, alarm lifecycle calculator 1801 takes as input a collection of alarm events for a given monitored location, ordered by time, and returns a collection of alarm incident states. In certain implementations, an alarm incident state includes the contiguous block of alarm events associated with the calculation, and the alarm state data derived from the alarm events. The alarm state data indicates, for example, whether a given alarm incident is currently in progress or resolved. The details of the alarm state data may be specific to the alarm event type. For example, an alarm signal will have an event contact identifier and a zone identifier, whereas an action performed by monitoring center environment personnel will have an action code, and optionally a comment or other similar information. The zone identifier is used, in certain implementations, to identify the type of device that has generated a given alarm signal. When all alarm events have been processed, the collection of alarm incident states is finalized, and the alarm lifecycle calculation is complete.

When incoming alarm events are processed by alarm lifecycle calculator 1801 as illustrated in FIG. 18, alarm events triggered by personnel at the monitoring center environment, dispatch personnel, or emergency services personnel will generally aggregate into an existing alarm incident status calculation. Alarm events generated in response to a customer request (such as an alarm cancellation or a request for assistance) will also generally aggregate into an existing alarm incident status calculation. Alarm events generated from an alarm system, such as a location-based device, may trigger the creation of a new alarm incident status calculation, such as a panic signal generated by pressing a button on a keypad or fob. Likewise, the alarm lifecycle calculator 1801 may identify certain events, such as a signal from the monitoring center environment that an alarm has been successfully cancelled, as triggering the closing of an alarm incident, such that a subsequent alarm signal is separated into a corresponding subsequent alarm incident. Thus, alarm lifecycle calculator 1801 is capable of both timeline-based and rules-based differential processing of alarm events.

As outlined above, if there is an existing active alarm incident, the alarm event will be aggregated into the existing alarm incident status calculation, though it may change the handling of the alarm incident if the incoming alarm event has a higher priority than the alarm event currently governing the handling of the alarm incident. If there is not an existing active alarm incident, the incoming alarm event will trigger the creation of a new alarm incident status calculation.

In some cases a de-duplication process is invoked before performing an alarm incident status calculation to avoid processing a same event multiple times. For example, when incoming alarm events are processed, de-duplication can be performed to determine whether the incoming alarm event has already been incorporated into an alarm event history for the relevant location. The de-duplication process may also be used, for example, to enforce a rule that each alarm event can be associated with only one alarm incident.

As alluded to above, certain alarm events can cause the priority of an active alarm event to be escalated, thereby affecting how the incident is handled (for example, by monitoring center environment personnel). For example, if an alarm event is generated at a monitored location due to a glass break sensor having been triggered, the corresponding alarm incident might be rated as a burglary. Personnel at the monitoring center environment may respond by evaluating video clips captured by one or more image capture devices at the monitored location and dispatching law enforcement. If a customer arrives at the monitored location and generates a subsequent alarm event by actuating a "panic" button, that subsequent event may escalate handling of the alarm incident, thereby causing police dispatch to be prioritized. If the customer generates a subsequent alarm event by providing a "duress PIN", then that subsequent event may further escalate the police response, cause a monitoring specialist to abort customer contact calls, silence sirens annunciating the alarm, and/or hide alarm state information from the customer.

In certain implementations, only one alarm incident may be active at a particular time at a particular monitored location. In some cases, the active alarm incident can be assigned a high (or highest) priority and the handling of the alarm incident by personnel at the monitoring center environment and the user interface provided to the customer is adjusted accordingly. The priority of an active alarm incident may be referred to as a governing signal that reflects both the monitoring center event handling protocol for the alarm (for example, how the monitoring center environment will handle the alarm) and governs the user's experience vis-à-vis the alarm (including what is displayed to the user and what options are provided to the user). For example, a triggering alarm event may be associated with an initial lower priority, but the governing signal can be escalated in response to subsequently received alarm events based on, for example, actuation of a panic button or actuation and/or provision of a duress PIN. The governing signal and the alarm category may reflect what actions the monitoring center environment is expected to take, if any, in response to a given alarm incident and dictate the customer's user experience.

In some cases priority escalation may make some alarms no longer cancelable, in which case monitoring center environment personnel may still dispatch emergency responders notwithstanding subsequent provision of a disarm or cancel command. These sequences of events may be processed differently in alternative implementations.

Figure 19:
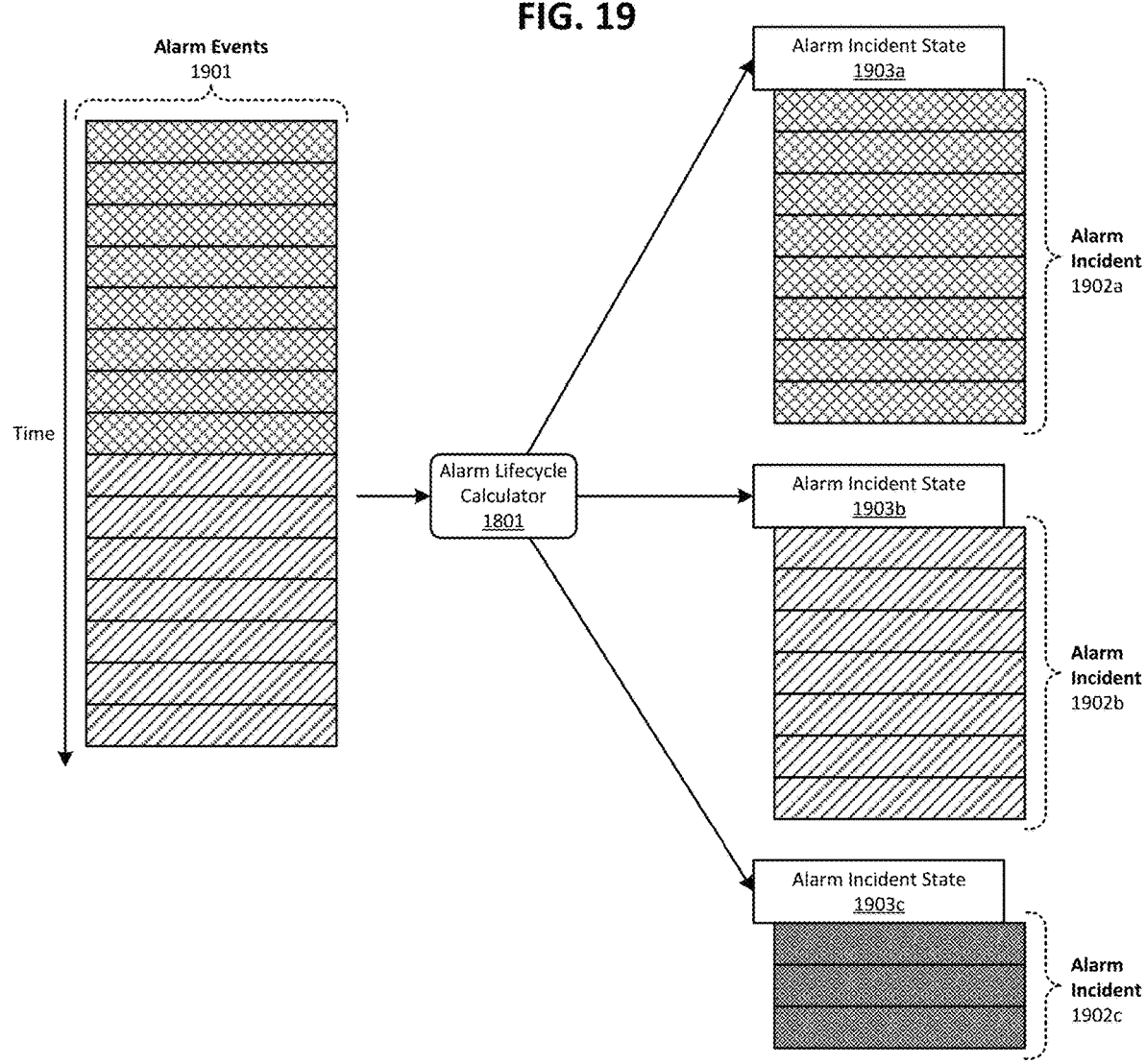
FIG. 19 is a schematic diagram illustrating the segmentation of an ordered list of alarm events into alarm incidents, according to some examples described herein.

FIG. 19 is a schematic diagram illustrating the segmentation of an ordered list of alarm events 1901 into alarm incidents 1902*a*, 1902*b*, 1902*c*, according to some examples described herein. More specifically, FIG. 19 represents the transformation of a collection of time-ordered alarm events 1901 into a collection of alarm incident states 1903*a*, 1903*b*, 1903*c* using alarm lifecycle calculator 1801. As illustrated, an alarm incident state (for example, state 1903*a*) is associated with a contiguous collection of alarm events (for example, the collection of alarm events aggregated into alarm incident 1902*a*).

Before alarm lifecycle calculator 1801 is invoked, event data 1702 may be received from event queue 1703 or retrieved from alarm history persistence resource 1710. An incoming alarm event is combined with existing (that is, previously received) alarm events to form a chronologically-ordered sequence of alarm events 1901. Alarm lifecycle calculator 1801 generates alarm incident states 1903*a*, 1903*b*, 1903*c*, and determines how the collection of alarm events 1901 should be allocated into alarm incidents 1902*a*, 1902*b*, 1902*c*, regardless of previous assignments. One technique for performing these allocations and determining these states is schematically illustrated in FIG. 18.

For example, if there are ten existing alarm events and an incoming (eleventh) alarm event is received, execution of alarm lifecycle calculator 1801 could result in a total redistribution of the eleven alarm events. Execution of alarm lifecycle calculator 1801 will also result in updated alarm incident states. For example, in the particular application represented in FIG. 19, receipt of one new alarm event results in up to three updated alarm incident states. In other words, receipt of a new alarm event triggers a reassessment of previously-received alarm events as part of the chronologically-ordered input to alarm lifecycle calculator 1801, although that reassessment may not necessarily result in a modified alarm incident state for existing alarm incidents. Because certain alarm events may not affect the state of the corresponding alarm incident, it is possible that processing of an incoming alarm event does not result in modification of any previously calculated alarm incident states. In applications where there are no existing alarm incidents when a new alarm event is received, a new alarm incident is created and a state for that new alarm incident is determined.

Figure 20:
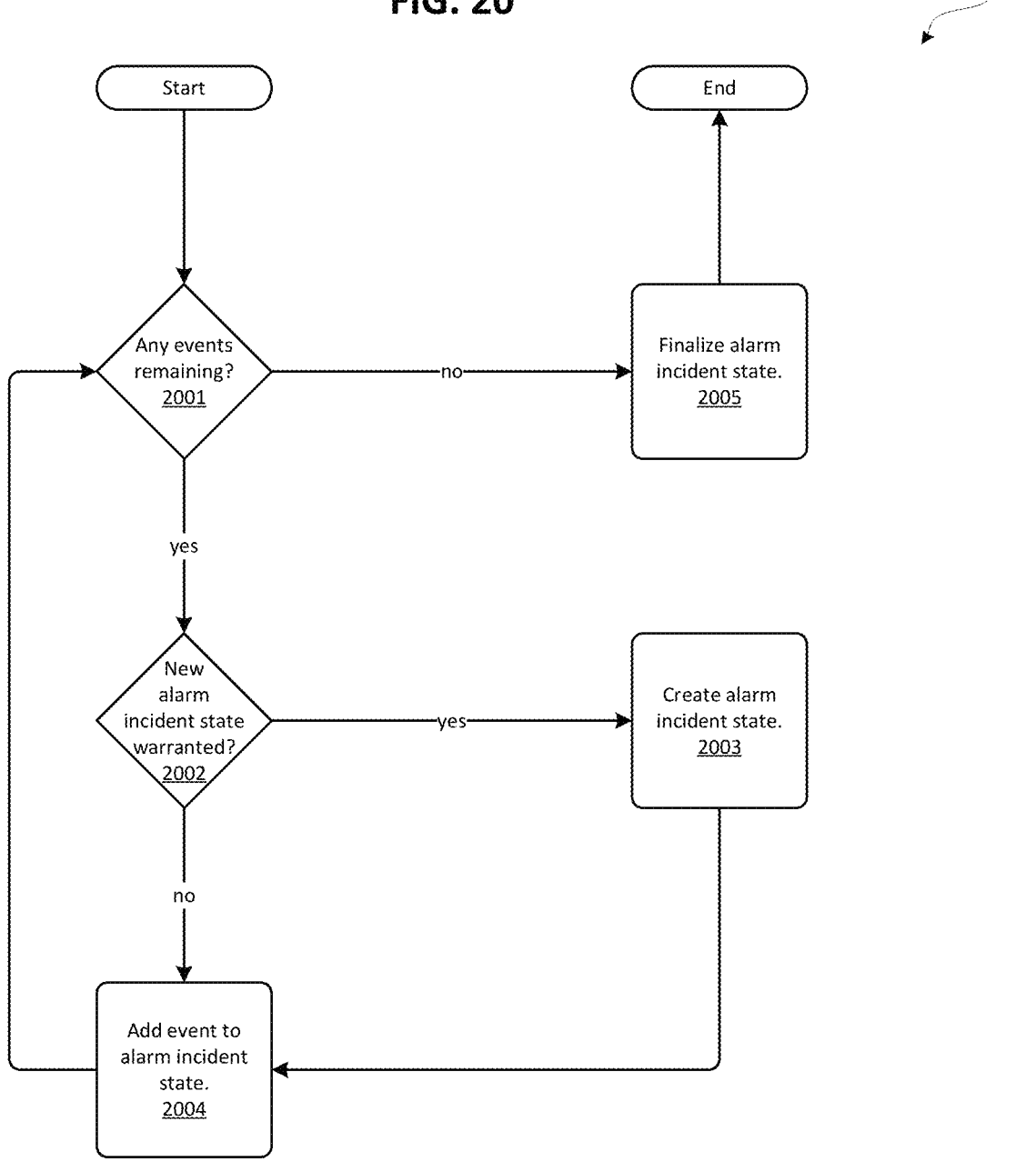
FIG. 20 is a flowchart illustrating a technique for processing a collection of alarm events into alarm incident states, according to some examples described herein.

FIG. 20 is a flowchart illustrating a method 2000 for processing a collection of alarm events, according to some examples described herein. More specifically, FIG. 20 represents example logic that can be invoked to process a collection of alarm events using alarm lifecycle calculator 1801 as disclosed herein. Method 2000 begins by making a determination with respect to whether any unprocessed incoming events exist or remain. See reference numeral 2001 in FIG. 20. For an unprocessed incoming alarm event, alarm lifecycle calculator 1801 determines whether a new alarm incident state calculation is warranted. See reference numeral 2002 in FIG. 20. A new alarm incident state calculation can be warranted when, for example, there is no active alarm incident status calculation; when an alarm event is trigged by a monitoring specialist, a dispatcher, emergency services personnel, or other designated personnel; and/or a customer request for alarm cancellation or assistance is received. On the other hand, if there is an active alarm incident, an alarm event may be aggregated into an existing alarm incident status calculation. Different criteria for determining whether a new alarm incident state calculation is warranted can be applied in different implementations. If a new alarm incident state calculation is warranted, such calculation is created. See reference numeral 2003 in FIG. 20.

After an alarm incident state is created, if warranted, the alarm lifecycle calculator then adds the incoming alarm event to the alarm incident state. See reference numeral 2004 in FIG. 20. When all alarm events (for example, all queued alarm events at any given time) have been processed, the collection of alarm incident states is finalized by applying additional logic to the partial state of each alarm incident state. See reference numeral 2005 in FIG. 20. The resulting collection of alarm incident states is then returned.

In certain implementations alarm history service 1704 maps an alarm incident state calculation by alarm lifecycle calculator 1801 to either an existing alarm incident or a new alarm incident. Alarm history service 1704 further updates the assignment of the alarm events to reflect the current associations to alarm incidents, persists the alarm incidents and any modified alarm events, and then publishes the updated alarm incidents and any modified alarm events to the appropriate message topics. This information can ultimately be presented in, for example, a consolidated alarm user interface wherein the components of the user interface optionally depend on the category of alarm incident (for example, burglary, fire, medical emergency, environmental event).

As described above, alarm signals can be delivered to the alarm history service through at least two channels. First, as the data center environment delivers the alarm signals from components at the monitored location to the monitoring center environment, messages can be generated documenting such delivery. In this context, alarm lifecycle calculator 1801 can optionally predict how the incoming alarm signal will be handled by the monitoring center environment. Additionally or alternatively, when the monitoring center environment receives the alarm signal, it can generate an alarm event documenting the delivery. If the alarm signal is delivered from the monitoring center environment itself, the handling of such alarm signal is generally resolved prior to the corresponding alarm event being generated.

For example, an alarm event may be generated at a monitored location due to a glass break sensor having been triggered. An electronic alarm cancellation signal is received a short time later. This scenario results in four distinct alarm events associated with a single alarm incident: an alarm event generated by the glass break sensor, an alarm event generated by receipt of the glass break signal by the monitoring center environment (a burglary signal was received and will be handled accordingly), an alarm event corresponding to the electronic cancellation (for example generated by the base station, a text message cancel command, or an application-generated cancel command), and as long as the cancellation occurs within a specified time interval from the initial glass break signal, an alarm event generated by the receipt of the cancellation signal by the monitoring center environment that indicates that the cancel signal was received and the alarm will be treated as a false alarm. Based on this common event sequence, a prediction can be made that the incoming cancellation signal will, in fact, result in cancellation of the active alarm, such prediction being made even before the monitoring center environment actually cancels the alarm. Later a confirmation can be received that the monitoring center environment actually cancelled the alarm as predicted. In this example, alarm lifecycle calculator 1801 may trigger an update to a corresponding customer state, indicating the customer's request to cancel the alarm. The customer may cancel the alarm using a mobile application (for example that provides customer interface 132A), using SMS text messaging, and/or using other similar communication means. In this example, if the customer does not cancel the alarm, the monitoring state may change, but the customer state would not until an event is received documenting another customer interaction.

When signals are received from the monitoring center environment that characterize a response to a given alarm event, further predictions may be made regarding next actions which may be taken by monitoring personnel. For example, the monitoring center environment may send an acknowledgement of an incoming alarm signal with information about how monitoring personnel plan to handle the alarm signal. Additionally or alternatively, the monitoring center environment may send data characterizing activities of the monitoring personnel as they handle the alarm incident. Such data might indicate, for example that monitoring personnel have attempted to dispatch emergency response to an invalid address or have attempted to call an invalid phone number. Each different message might have custom logic tailored to address a given situation.

While alarm signals generated by the data center environment will often be received and handled before those generated by the monitoring center environment, race conditions may resolve themselves in such a fashion that alarm signals are received in the opposite order. However, regardless of which channel delivers the alarm signal event and in what order, the evaluation and response by alarm lifecycle calculator 1801, as described herein, can be the same.

As noted above, the triggering and subsequent handling of an alarm may involve actions taken by various actors interacting with alarm system components. These various actors respond in different ways to an alarm event depending on the type of alarm incident (for example, burglary, fire, medical emergency, environmental event). So a given alarm incident has different states corresponding to the status of these different actors. Because alarm incident state is not readily distilled into a single value, in certain implementations its representation can include a state per actor.

In certain implementations alarm lifecycle calculator 1801 determines an "alarm state" that represents those properties of the alarm incident that are common across all relevant actors for the alarm incident. Examples of alarm state include, but are not limited to, a creation timestamp (the timestamp of the alarm event that triggered the alarm incident), an alarm category, a monitored location identifier, a triggering signal, a governing signal, and a final alarm disposition (for example, actual or false).

In certain implementations alarm lifecycle calculator 1801 determines a "monitoring state" that represents the handling of the alarm incident as performed by the monitoring center environment, monitoring center environment personnel, and other personnel downstream of the monitoring center environment. Examples of monitoring state include, but are not limited to, an overall state (for example, representing whether the alarm is actively being handled by the monitoring center environment), details of the active monitoring center environment personnel assigned to the alarm incident, and any monitoring outcomes or dispositions. Monitoring state can be updated based on events generated by the monitoring center environment, monitoring center environment personnel, and other personnel downstream of the monitoring center environment.

In certain implementations alarm lifecycle calculator 1801 determines a "customer contact state" that represents, for example, requests initiated by the customer and communications between the monitored location's customer contacts and the monitoring center environment. In certain implementations customers can request that an alarm be cancelled or that emergency services be dispatched via phone calls between the customer contact and the monitoring center. Such requests may be initiated using a mobile application (for example that provides customer interface 132A), using SMS text messaging, and/or using other similar communication means. Different customers may make conflicting requests, in which case the alarm lifecycle calculator 1801 can be configured to determine the overall alarm incident state based on the nature and timing of the various requests. Customer contact state can be updated based on incoming customer requests and events generated by the monitoring center environment, monitoring center environment personnel, and other personnel downstream of the monitoring center environment.

In certain implementations alarm lifecycle calculator 1801 determines a "dispatch state" that represents the state of dispatch requests for emergency services. Dispatch may be requested by, for example, personnel associated with the monitoring center environment. The dispatch of emergency services may be accepted or declined. After dispatch of emergency services has been requested, the dispatch may be cancelled, for example, when an alarm is later determined to be a false alarm. Dispatch state can be updated based on events generated by the monitoring center environment, monitoring center environment personnel, and other personnel downstream of the monitoring center environment.

Monitoring center personnel may undertake additional follow-up actions after the alarm incident has concluded. Examples of such follow-up actions include, but are not limited to, handling a customer or dispatcher call requesting additional information on the alarm incident; handling a customer call requesting that the alarm incident handling be changed (for example, by cancelling a dispatch request); handling a dispatcher call requesting and/or updating alarm incident status; and handling an inbound request in accordance with the Automated Secure Alarm Protocol (ASAP). In general, a customer or dispatcher may call regarding any concluded alarm incident, and thus such follow-up actions are not necessarily associated with the most recently concluded alarm incident. Thus, in certain implementations monitoring personnel may annotate such follow-up actions with an identified alarm incident, thus allowing alarm incident status to be updated accurately. In such implementations, the annotation provided by the monitoring personnel may override a general instruction to aggregate alarm events by timestamp.

Figure 16:
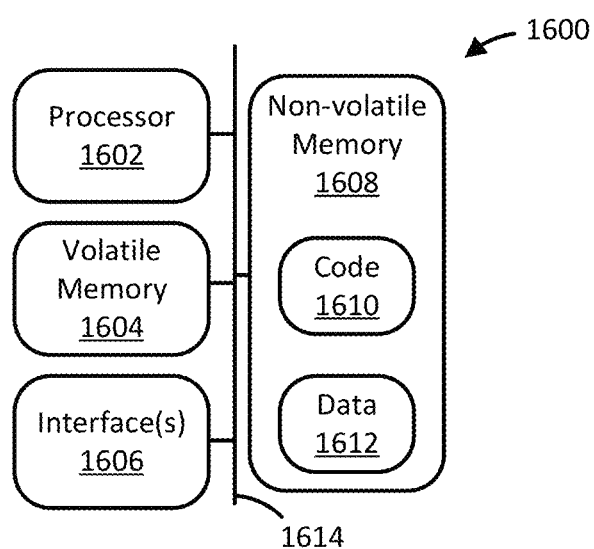
FIG. 16 is a schematic diagram of a computing device, according to some examples described herein.

Turning now to FIG. 16, a computing device 1600 is illustrated schematically. As shown in FIG. 16, the computing device includes at least one processor 1602, volatile memory 1604, one or more interfaces 1606, non-volatile memory 1608, and an interconnection mechanism 1614. The non-volatile memory 1608 includes code 1610 and at least one data store 1612.

In some examples, the non-volatile (non-transitory) memory 1608 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1610 stored in the non-volatile memory can include an operating system and one or more applications or programs that are configured to execute under the operating system. Alternatively or additionally, the code 1610 can include specialized firmware and embedded software that is executable without dependence upon a commercially available operating system. Regardless, execution of the code 1610 can result in manipulated data that may be stored in the data store 1612 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 16, the processor 1602 can be one or more programmable processors to execute one or more executable instructions, such as a computer program specified by the code 1610, to control the operations of the computing device 1600. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1604) and executed by the circuitry. In some examples, the processor 1602 is a digital processor, but the processor 1602 can be analog, digital, or mixed. As such, the processor 1602 can execute the function, operation, or sequence of operations using digital values and/or using analog signals. In some examples, the processor 1602 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1602 that are multicore can provide functionality for parallel, simultaneous execution of instructions or for parallel, simultaneous execution of one instruction on more than one piece of data.

Continuing with the example of FIG. 16, prior to execution of the code 1610 the processor 1602 can copy the code 1610 from the non-volatile memory 1608 to the volatile memory 1604. In some examples, the volatile memory 1604 includes one or more static or dynamic random access memory (RAM) chips and/or cache memory (e.g. memory disposed on a silicon die of the processor 1602). Volatile memory 1604 can offer a faster response time than a main memory, such as the non-volatile memory 1608.

Through execution of the code 1610, the processor 1602 can control operation of the interfaces 1606. The interfaces 1606 can include network interfaces. These network interfaces can include one or more physical interfaces (e.g., a radio, an ethernet port, a USB port, etc.) and a software stack including drivers and/or other code 1610 that is configured to communicate with the one or more physical interfaces to support one or more LAN, PAN, and/or WAN standard communication protocols. The communication protocols can include, for example, TCP and UDP among others. As such, the network interfaces enable the computing device 1600 to access and communicate with other computing devices via a computer network.

The interfaces 1606 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1610 that is configured to communicate with the user input and/or output devices. As such, the user interfaces enable the computing device 1600 to interact with users to receive input and/or render output. This rendered output can include, for instance, one or more GUIs including one or more controls configured to display output and/or receive input. The input can specify values to be stored in the data store 1612. The output can indicate values stored in the data store 1612.

Continuing with the example of FIG. 16, the various features of the computing device 1600 described above can communicate with one another via the interconnection mechanism 1614. In some examples, the interconnection mechanism 1614 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method that comprises receiving, by a first computing device, a plurality of events, each event including a timestamp and an indicator that corresponds with a location where the corresponding event occurred. The method further comprises generating, by the first computing device, from the plurality of events, a list of events that occurred at a particular location. The method further comprises chronologically ordering, based on the timestamps, the list of events that occurred at the particular location, thereby producing a chronologically ordered list of events. The method further comprises allocating the events in the chronologically ordered list into a plurality of alarm incidents, a particular one of the alarm incidents having allocated thereto events that occurred at the particular location. The method further comprises receiving, from a second computing device via a network connection, a request for one or more alarm incidents for the particular location. The method further comprises after receiving the request, sending, to the second computing device, via the network connection, the particular alarm incident.

Example 2 includes the method of Example 1, wherein the plurality of events are received in a corresponding plurality of push notifications that are delivered pursuant to one or more subscriptions to one or more data distribution platforms.

Example 3 includes the method of one of Examples 1 or 2, further comprising sending a request to a source of a particular one of the plurality of events, wherein the particular event is received after sending the request to the source of the particular event.

Example 4 includes the method of one of Examples 1 or 2, further comprising sending a request to a source of a particular one of the plurality of events, wherein sending the request results in receipt of the particular event.

Example 5 includes the method of any one of Examples 1 through 4, further comprising determining an incident state for the particular alarm incident, wherein the incident state characterizes at least one of a customer state, a monitoring state, or a dispatch state for the particular alarm incident.

Example 6 includes the method of any one of Examples 1 through 4, further comprising determining a current incident state for the particular alarm incident, wherein the current incident state characterizes at least one of a customer state, a monitoring state, or a dispatch state for the particular alarm incident; and modifying a previous incident state to reflect the current incident state.

Example 7 includes the method of any one of Examples 1 through 4, further comprising determining an incident state for the particular alarm incident, wherein the incident state characterizes at least one of a customer state, a monitoring state, or a dispatch state for the particular alarm incident; and sending, to the second computing device via the network connection, the incident state.

Example 8 includes the method of any one of Examples 1 through 7, further comprising after receiving a particular one of the plurality of events, taking a responsive action in accordance with an event handling protocol for the location where the particular event occurred.

Example 9 includes the method of any one of Examples 1 through 4, further comprising determining an incident state for the particular alarm incident, wherein the incident state characterizes at least one of a customer state, a monitoring state, or a dispatch state for the particular alarm incident; and presenting, in a user interface, the incident state for the particular alarm incident.

Example 10 includes the method of any one of Examples 1 through 4, further comprising determining an incident state for the particular alarm incident, wherein the incident state characterizes at least one of a customer state, a monitoring state, or a dispatch state for the particular alarm incident, wherein the incident state is determined after allocating more than one of the plurality of events to the particular alarm incident.

Example 11 includes the method of any one of Examples 1 through 10, wherein the indicator uniquely identifies the location where the corresponding event occurred.

Example 12 includes the method of Examples 1 through 11, wherein a particular one of the events includes a classification of the particular event, the particular alarm incident having allocated thereto events having the classification.

Example 13 provides one or more non-transitory computer readable storage media that store sequences of instructions executable by one or more processors. The sequences of instructions comprise instructions to receive, by a first computing device, a plurality of events, each event including a timestamp and an indicator that corresponds with a location where the corresponding event occurred. The sequences of instructions further comprise instructions to generate, by the first computing device, a list of events ordered chronologically based on the timestamps. The sequences of instructions further comprise instructions to allocate the events in the list into a plurality of alarm incidents, a particular one of the alarm incidents having allocated thereto events that occurred at a particular location. The sequences of instructions further comprise instructions to receive, from a second computing device via a network connection, a request for one or more alarm incidents for the particular location. The sequences of instructions further comprise instructions to, after receiving the request, send, to the second computing device, via the network connection, the particular alarm incident.

Example 14 includes the one or more non-transitory computer readable storage media of Example 13, wherein the sequences of instructions further comprise instructions to after receiving a particular one of the plurality of events, take a responsive action in accordance with an event handling protocol for the location where the particular event occurred.

Example 15 includes the one or more non-transitory computer readable storage media of one of Examples 13 or 14, wherein the sequences of instructions further comprise instructions to receive a consumer request that specifies one or more of the particular location or a timeframe during which at least a portion of the particular alarm incident occurred.

Example 16 includes the one or more non-transitory computer readable storage media of one of Examples 13 or 14, wherein the sequences of instructions further comprise instructions to receive a consumer request that specifies a timeframe during which at least a portion of the particular alarm incident occurred; and responsive to the consumer request, send the particular alarm incident to a consumer device associated with the consumer request.

Example 17 includes the one or more non-transitory computer readable storage media of any one of Examples 13 through 16, wherein the sequences of instructions further comprise instructions to send the particular alarm incident to a consumer device via an asynchronous subscription communication that occurs in response to allocating the events in the list into the plurality of alarm incidents.

Example 18 is a system that comprises a memory. The system further comprises a network interface. The system further comprises at least one processor coupled with the memory and the network interface. The at least one processor is configured to receive a plurality of events, each event including a timestamp and an indicator that corresponds with a location where the corresponding event occurred. The at least one processor is further configured to generate a list of events ordered chronologically based on the timestamps, wherein the list of events includes events that occurred at a plurality of locations. The at least one processor is further configured to allocate the events in the list into a plurality of alarm incidents, a particular one of the alarm incidents having allocated thereto events that occurred at a particular one of the plurality of locations. The at least one processor is further configured to receive, from a computing device via the network interface, a request for one or more alarm incidents for the particular location. The at least one processor is further configured to, after receiving the request, send, to the computing device, via the network interface, an identifier for the particular alarm incident.

Example 19 includes the system of Example 18, wherein allocating the events in the list into the plurality of alarm incidents includes generating a new alarm incident and allocating one or more of the events in the list into the new alarm incident.

Example 20 includes the system of Example 18, wherein allocating the events in the list into the plurality of alarm incidents includes generating a new alarm incident and allocating one or more of the events in the list into the new alarm incident; the at least one processor is further configured to identify a prior event that occurred at the particular location before the new alarm incident was created; and the at least one processor is further configured to allocate, to the new alarm incident, the prior event.

Use of ordinal terms such as "first", "second", "third", etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
receiving, by a first computing device, a plurality of events, each event including a timestamp and an indicator that corresponds with a location where the corresponding event occurred;
generating, by the first computing device, from the plurality of events, a list of events that occurred at a particular location;
chronologically ordering, based on the timestamps, the list of events that occurred at the particular location, thereby producing a chronologically ordered list of events;
allocating the events in the chronologically ordered list into a plurality of alarm incidents, a particular one of the alarm incidents having allocated thereto events that occurred at the particular location;
sending the particular alarm incident to a consumer device via an asynchronous subscription communication that occurs in response to allocating the events in the chronologically ordered list into the plurality of alarm incidents;
receiving, from a second computing device via a network connection, a request for one or more alarm incidents for the particular location; and
after receiving the request, sending, to the second computing device, via the network connection, the particular alarm incident.

2. The method of claim 1, wherein the plurality of events are received in a corresponding plurality of push notifications that are delivered pursuant to one or more subscriptions to one or more data distribution platforms.

3. The method of claim 1, further comprising sending a request to a source of a particular one of the plurality of events, wherein the particular event is received after sending the request to the source of the particular event.

4. The method of claim 1, further comprising sending a request to a source of a particular one of the plurality of events, wherein sending the request results in receipt of the particular event.

5. The method of claim 1, further comprising determining an incident state for the particular alarm incident, wherein the incident state characterizes at least one of a customer state, a monitoring state, or a dispatch state for the particular alarm incident.

6. The method of claim 1, further comprising:
determining a current incident state for the particular alarm incident, wherein the current incident state characterizes at least one of a customer state, a monitoring state, or a dispatch state for the particular alarm incident; and
modifying a previous incident state to reflect the current incident state.

7. The method of claim 1, further comprising:
determining an incident state for the particular alarm incident, wherein the incident state characterizes at least one of a customer state, a monitoring state, or a dispatch state for the particular alarm incident; and
sending, to the second computing device via the network connection, the incident state.

8. The method of claim 1, further comprising:
after receiving a particular one of the plurality of events, taking a responsive action in accordance with an event handling protocol for a location where the particular event occurred.

9. The method of claim 1, further comprising:
determining an incident state for the particular alarm incident, wherein the incident state characterizes at least one of a customer state, a monitoring state, or a dispatch state for the particular alarm incident; and
presenting, in a user interface, the incident state for the particular alarm incident.

10. The method of claim 1, further comprising:
determining an incident state for the particular alarm incident, wherein the incident state characterizes at least one of a customer state, a monitoring state, or a dispatch state for the particular alarm incident,
wherein the incident state is determined after allocating more than one of the plurality of events to the particular alarm incident.

11. The method of claim 1, wherein the indicator uniquely identifies the location where the corresponding event occurred.

12. The method of claim 1, wherein a particular one of the events includes a classification of the particular event, the particular alarm incident having allocated thereto events having the classification.

13. One or more non-transitory computer readable storage media storing sequences of instructions executable by one or more processors, the sequences of instructions comprising instructions to:
receive, by a first computing device, a plurality of events, each event including a timestamp and an indicator that corresponds with a location where the corresponding event occurred;
generate, by the first computing device, a list of events ordered chronologically based on the timestamps;
allocate the events in the list into a plurality of alarm incidents, a particular one of the alarm incidents having allocated thereto events that occurred at a particular location;
send the particular alarm incident to a consumer device via an asynchronous subscription communication that occurs in response to allocating the events in the list into the plurality of alarm incidents;
receive, from a second computing device via a network connection, a request for one or more alarm incidents for the particular location; and
after receiving the request, send, to the second computing device, via the network connection, the particular alarm incident.

14. The one or more non-transitory computer readable storage media of claim 13, wherein the sequences of instructions further comprise instructions to:
after receiving a particular one of the plurality of events, take a responsive action in accordance with an event handling protocol for a location where the particular event occurred.

15. The one or more non-transitory computer readable storage media of claim 13, wherein the sequences of instructions further comprise instructions to receive a consumer request that specifies one or more of the particular location or a timeframe during which at least a portion of the particular alarm incident occurred.

16. The one or more non-transitory computer readable storage media of claim 13, wherein the sequences of instructions further comprise instructions to:
receive a consumer request that specifies a timeframe during which at least a portion of the particular alarm incident occurred;
wherein the particular alarm incident is sent to the consumer device after receiving the consumer request.

17. A system comprising:
a memory;
a network interface; and
at least one processor coupled with the memory and the network interface and configured to:
receive a plurality of events, each event including a timestamp and an indicator that corresponds with a location where the corresponding event occurred;
generate a list of events ordered chronologically based on the timestamps, wherein the list of events includes events that occurred at a plurality of locations;
allocate the events in the list into a plurality of alarm incidents, a particular one of the alarm incidents having allocated thereto events that occurred at a particular one of the plurality of locations;
send the particular alarm incident to a consumer device via an asynchronous subscription communication that occurs in response to allocating the events in the list into the plurality of alarm incidents;
receive, from a computing device via the network interface, a request for one or more alarm incidents for the particular location; and
after receiving the request, send, to the computing device, via the network interface, an identifier for the particular alarm incident.

18. The system of claim 17, wherein allocating the events in the list into the plurality of alarm incidents includes generating a new alarm incident and allocating one or more of the events in the list into the new alarm incident.

19. The system of claim 17, wherein:
allocating the events in the list into the plurality of alarm incidents includes generating a new alarm incident and allocating one or more of the events in the list into the new alarm incident;
the at least one processor is further configured to identify a prior event that occurred at the particular location before the new alarm incident was created; and
the at least one processor is further configured to allocate, to the new alarm incident, the prior event.

20. The system of claim 17, wherein:
the at least one processor is further configured to receive a consumer request that specifies a timeframe during which at least a portion of the particular alarm incident occurred; and
the particular alarm incident is sent to the consumer device after receiving the consumer request.

* * * * *